(12) United States Patent
Kayam et al.

(10) Patent No.: US 7,774,747 B2
(45) Date of Patent: Aug. 10, 2010

(54) SYSTEM AND ASSOCIATED METHODS FOR SOFTWARE ASSEMBLY

(75) Inventors: Abdul Kayam, Solihull (GB); Stephen J. R. Bailey, Solihull (GB)

(73) Assignee: Hyfinity Limited, Solihull (GB)

( * ) Notice: Subject to any disclaimer, the term of this patent is extended or adjusted under 35 U.S.C. 154(b) by 829 days.

(21) Appl. No.: 10/687,941

(22) Filed: Oct. 17, 2003

(65) Prior Publication Data

US 2004/0268296 A1     Dec. 30, 2004

(30) Foreign Application Priority Data

Jun. 25, 2003   (GB)   ................... 0314800.4

(51) Int. Cl.
 *G06F 9/44* (2006.01)
 *G06F 15/16* (2006.01)
 *G06F 15/167* (2006.01)

(52) U.S. Cl. .................. 717/107; 709/203; 709/205; 709/217; 709/219; 719/311

(58) Field of Classification Search .................. 717/107
See application file for complete search history.

(56) References Cited

U.S. PATENT DOCUMENTS

| | | | |
|---|---|---|---|
| 5,247,693 A | 9/1993 | Bristol | |
| 5,381,548 A | 1/1995 | Matsuo | |
| 5,850,548 A | 12/1998 | Williams | |
| 5,999,729 A | 12/1999 | Tabloski, Jr. et al. | |
| 6,097,886 A | 8/2000 | Dave et al. | |
| 6,189,138 B1 | 2/2001 | Fowlow et al. | |
| 6,230,309 B1 | 5/2001 | Turner et al. | |
| 6,434,740 B1 | 8/2002 | Monday et al. | |
| 6,601,234 B1 * | 7/2003 | Bowman-Amuah | ......... 717/108 |
| 6,637,020 B1 | 10/2003 | Hammond | |
| 6,738,975 B1 * | 5/2004 | Yee et al. | ..................... 719/310 |
| 6,742,175 B1 | 5/2004 | Brassard | |

(Continued)

FOREIGN PATENT DOCUMENTS

EP     0 860 773 A1     8/1998

(Continued)

OTHER PUBLICATIONS

R. Kraft, Designing a Distributed Access Control Processor for Network Services on the Web, Nov. 22, 2002, ACM. pp. 36-52.*

(Continued)

*Primary Examiner*—Michael J Yigdall
*Assistant Examiner*—Ben C Wang
(74) *Attorney, Agent, or Firm*—Fenwick & West LLP

(57) ABSTRACT

A method of creating an application comprising providing a set of predetermined rules for processing data; creating at least one node, each created node being capable of receiving data and further being capable of processing that data within the node according to the set of predetermined rules and making an output; creating a specification that defines how the or each node interacts with other nodes and defines resources useable by the nodes; and providing a run time environment that interconnects the or each node according to the specification such that data input to the application is processed by at least one of the nodes and, if further processing is required, forwarded to other nodes for that further processing.

58 Claims, 14 Drawing Sheets

U.S. PATENT DOCUMENTS

| | | | |
|---|---|---|---|
| 7,043,716 B2 * | 5/2006 | Zimmer et al. | 717/107 |
| 7,065,740 B2 * | 6/2006 | Westerinen et al. | 717/101 |
| 7,340,508 B1 * | 3/2008 | Kasi et al. | 709/219 |
| 2002/0026632 A1 | 2/2002 | Fuchs et al. | |
| 2003/0069871 A1 | 4/2003 | Yucel | |
| 2004/0034848 A1 * | 2/2004 | Moore et al. | 717/117 |
| 2004/0172441 A1 * | 9/2004 | Beringer et al. | 709/200 |
| 2004/0205765 A1 * | 10/2004 | Beringer et al. | 719/311 |
| 2005/0240902 A1 * | 10/2005 | Bunker et al. | 717/114 |
| 2006/0265689 A1 * | 11/2006 | Kuznetsov et al. | 717/117 |

FOREIGN PATENT DOCUMENTS

| | | |
|---|---|---|
| EP | 0 860 773 B1 | 4/2004 |
| WO | WO 91/08543 | 6/1991 |
| WO | WO 00/29924 * | 5/2000 |
| WO | WO 01/08007 A1 | 2/2001 |
| WO | WO 0125954 A2 * | 4/2001 |
| WO | WO 01/38976 A1 | 5/2001 |
| WO | WO 02/42987 A2 | 5/2002 |
| WO | WO 02/42987 A3 | 5/2002 |
| WO | WO 02/44854 A2 | 6/2002 |
| WO | WO 02/50670 A1 | 6/2002 |
| WO | WO 03/005249 A2 | 1/2003 |
| WO | WO 03/005249 A3 | 1/2003 |

OTHER PUBLICATIONS

Thilmany et al., "BizTalk: Implement Design Patterns for Business Rules with Orchestration Designer", Oct. 2001, MSDN Magazine, pp. 1-8.*

Lee et al., "The Extensible Rule Markup Language", May 2003, ACM, pp. 59-64.*

Peltz et al., "Web Services Orchestration", Jan. 2003, Hewlett-Packard Company, pp. 1-20.*

Hillman, A network programming package in Eiffel, Technology of Object-Oriented Languages and Systems, Proceedings of the $2^{nd}$ Conference Tools 1990, ISBN: 2-287892-000-7, pp. 541-551.

Morphyc Architecture [Retrieved in 2002], Retrieved from the Internet<URL:http://www.hyfinity.com/Morphyc%20Architecture.pdf.

Morphyc Architecture Guide [Retrieved on Sep. 12, 2003], Retrieved from the Internet<URL:http://www.hyfinity.com/documentation/Morphyc/Morohyc%20Architecture%20Guide/print.html.

Micklewright, Patents Act 1977: Search Report under Section 17(5), Letter to Hyfinity Limited on Reference GOS636, Application No. GB414226.1, Oct. 28, 2004, The Patent Office, England.

European Search Report, EP 04 25 3799, May 22, 2007.

Thomas, A., "Enterprise JavaBeans™ Server Component Model for Java," Patricia Seybold Group, Prepared for Sun Microsystems, Inc., 1997, 22 pages.

* cited by examiner

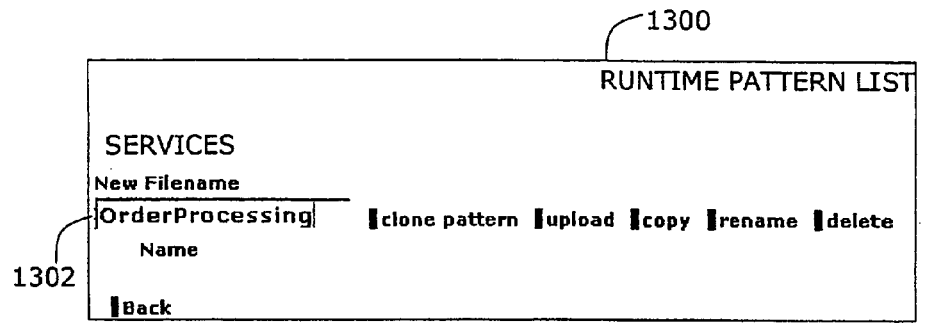
Fig. 14
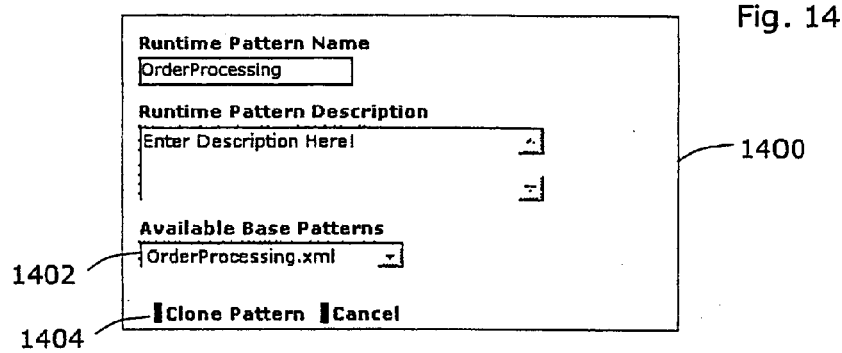
Fig. 15
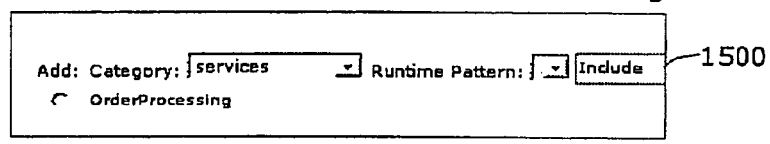
Fig. 16
Fig. 17

2400
```
┌─────────────────────────────────────────────────────────────────────┐
│                                                              Clause │
│                                                                     │
│   Runtime Pattern    OrderProcessing.xml                            │
│   Node               Order                                          │
│   Logicsheet         OrderProcessing_Order_rules.xml                │
│                                                                     │
│   Clause Details                                                    │
│   Rule               parse_ts_and_cs                                │
│   Rule Description                                                  │
│   Clause             check_root_element                             │
│   Multiple           [false ▼]                          ──────────────── 2402
│                                                                     │
│   Parameter Details                                                 │
│   Name               Editor            Value                        │
│   xpath_expression   XPath             /                            │
│                                                                     │
└─────────────────────────────────────────────────────────────────────┘
```
Fig. 25

2500
```
┌─────────────────────────────────────────────────────────────────────┐
│                                                          Parameter  │
│                                                                     │
│   Runtime Pattern    OrderProcessing.xml                            │
│   Node               Order                                          │
│   Logicsheet         OrderProcessing_Order_rules.xml                │
│                                                                     │
│   Parameter Details                                                 │
│   Rule               parse_ts_and_cs                                │
│   Rule Description                                                  │
│   Clause             check_root_element                             │
│   Parameter Name     xpath_expression                               │
│   Parameter Type     com.hyfinity.xpath.XPath                       │
│   Parameter Editor   XPath                                          │
│   Value                                                             │
│   ┌─────────────────────────────────────────────────────────────┐   │
│   │ /po                                                      ▲  │   │
│   │                                                             │   │
│   │                                                             │   │
│   │                                         ▼│PathFinder│TreeView│   │
│   │Back │Save │Cancel                                           │   │
│   └─────────────────────────────────────────────────────────────┘   │
└─────────────────────────────────────────────────────────────────────┘
```
2502 points to "Value"

Engine and Resource Details

Runtime Pattern Name: OrderProcessing
Node name: Order

Engine Details

Engine Name
Engine

Engine Description
Engine

Engine Type
XEngine

Engine Runtime Instance
Com.hyfinity.xengine.XEngine logicsheet
OrderProcessing_order_Rules.xml Logicsheet Description
OrderProcessing order Rules 2902 — Resource Details

2904 — Available Resource Categories
Other Resource Categories

2906 — Resource in Category
TermAndConditions.xml  : Add Resource

2908 — Current Resources
Name                                              Type    Resource Ref.
There are currently no resources for this category

SYSTEM AND ASSOCIATED METHODS FOR SOFTWARE ASSEMBLY

CROSS-REFERENCE TO RELATED APPLICATION

This application claims priority under 35 U.S.C. §119 from UK patent application number 0314800.4, filed Jun. 25, 2003.

FIELD OF THE INVENTION

This invention relates to a system and associated methods for software assembly.

DESCRIPTION OF RELATED ARTS

It will be appreciated that an application is required to cause a processing apparatus, which may be a computer, to perform a task. This application may be defined in hardware or software. It is convenient to consider software applications since these are perhaps more common.

Such software applications have traditionally followed what may be thought of as two paths: off the shelf packages and bespoke packages. Each path has its own advantages and disadvantages.

For example, off the shelf applications are perhaps cheaper than bespoke applications but generally cannot be tailored to a user's needs as much as a bespoke application. On the other hand since bespoke applications are written specifically to a user's requirements they may be tailored precisely to requirements but can be costly. The cost of a bespoke application of course includes the development, debugging and maintenance costs. Bespoke applications can often be error prone since they are written specifically for user's needs and therefore they are unlikely to benefit from the extensive testing that an off the shelf application will experience.

Therefore, a user wishing to perform a task must make the choice of whether to use an off the shelf application or to use a bespoke application. The off the shelf application may not provide all of the features that they require but may be cheaper and less prone to error. The bespoke application may be much more tailored to the user's needs but is likely to be slow to develop and costly to develop and maintain.

Many prior art systems are based around object oriented programming languages such as C#, C++, JAVA, and the like. Such languages define objects, or data structures, that have predetermined and rigid data formats. If such an object receives data that is not in the required format then an error will be generated and the program may fail. Such well formulated data structures are not necessarily well suited to data generated in the real world which does not necessarily follow such well defined data formats.

In the prior art attempts have been made to solve this problem and an example of a prior art document that shows a method and system for implementing process-based web applications is shown in EP 1 187 010. However, such solutions are limited in their applicability and may not increase the speed of development and robustness as much as may be desired.

SUMMARY OF THE PRESENT INVENTION

According to a first aspect of the invention there is provided a method of creating an application comprising:
  creating a plurality of nodes each node being capable of receiving data, processing that data within the node according to a set of predetermined rules and making an output;
  creating a specification that defines how the nodes interact with one another and defines resources useable by the nodes; and
  providing a run time environment that interconnects the nodes according to the specification such that data input to the application is processed by one or more of the nodes and if further processing is required, forwarded to other nodes for that further processing.

An advantage of such a method is that it allows an application to be implemented much more rapidly than prior art, particularly bespoke, applications. Such rapid development saves both cost and time for a party that is developing the application.

The method may comprise selecting one or more of the nodes from a library of nodes. Such an arrangement is convenient because, again, it speeds development of the application; if a node can be re-used without having to be re-written then the development time will be reduced.

Preferably each node is defined in software. The skilled person will of course appreciate that the nodes could also be implemented in hardware.

Each node preferably comprises a plurality of layers with each layer being arranged to perform a predetermined function. In the preferred embodiment each node comprises three layers. However, in additional or alternative embodiments any number of layers may be provided. For example, 1, 2, 4, 5, 6, 7, 8, 9, 10, 15 or more layers may be provided.

Conveniently the layers of a node are arranged to be interchangeable such that altering one or more of the layers can change the overall functionality of a node. Conveniently, a layer may be selected from a library of layers. Such an arrangement is convenient because again the amount of work in developing the application can be significantly reduced.

The method may comprise arranging one of the layers of the node to act as a transport layer arranged to receive and send data to and from the node. Such a layer is advantageous since is allows a node to be readily tailored to work with a variety of different transport mechanisms. For example, a transport layer may be provided that interfaces with TCP/IP, HTTP, SMTP, SOAP or the like communications.

Further, the method may arrange that one of the layers of the node acts as a message transceiver arranged to send and receive messages to other nodes to which that node is connected. The message transceiver layer of the node may be arranged to discover the identity of nodes to which it is connected at runtime of the application.

The method may arrange that one of the layers of the node acts as a rule processing engine arranged to apply predetermined rules to data that the node receives.

Preferably, the rule processing engine layer of a node uses forward chaining rule logic. Such a method is particularly convenient because is allows data received by the rule processing engine layer to fire one or more rules which may reduce, perhaps significantly, the amount of storage required for the rules; the use of forward chaining rules may significantly reduce the number of rules required in order to describe a situation and will reduce processing power requirements since only rules that are required are fired; irrelevant rules are not generally evaluated. Reducing the amount of storage in this manner provides a technical advantage and may also make the application faster; if there are less rules to process it is likely that the processing speed can be increased.

The method may provide the rules (e.g. a rule set) that are used by the rule processing engine in a file which will generally be a specific file for each rule set. Such a method is convenient because it allows the rules to be readily amended and also it allows the rules to be reused by a plurality of rule processing engines. Conveniently, the file in which the rules are located is specified by a link, sometimes referred to as a pointer.

Each rule set may be conveniently be thought of as an asset that a node can utilise.

Further, the method may define predetermined messages that can be passed between the nodes. These messages may also be thought of as an asset that the node can utilise.

Conveniently, the specification defines the messages and/or rule sets that are to be used by the application. Such an arrangement is convenient because it allows the same message and/or rule set to be re-used and can therefore reduce, perhaps significantly, the complexity of the files required for the application.

The method may arrange for the messages to be in XML.

Messages may be processed by the rules within the node. The rules may be arranged such that they are only triggered if the message contains predetermined trigger data. An advantage of such an arrangement is that the system may become more robust; the format of the messages does not matter and the message is simply processed to determine whether it has the relevant trigger data to trigger a rule. This is in contrast to prior art systems, may be those based upon object oriented techniques, that are likely to fail if the data received is not in the predetermined format.

Conveniently, the layers of the node are specified by files and generally each layer is specified by a specific file.

Preferably the or each node in the application is provided within a pattern that defines how nodes therein interact with one another. Such a method is convenient because again, it can reduce the amount of work in creating the application.

The method may provide a library of patterns that can be used in creating an application. Patterns may be provided to perform tasks that are commonly required. As an example a pattern may be provided that performs any of the following: receives and processes an invoice; receives and processes an email; raises an invoice; adds an entry to a database (perhaps using SQL or the like).

The specification that may be thought of as a blueprint. The specification may determine any of the following non-exhaustive list: which nodes are to be used; which nodes interact with one another; which patterns are to be used, which assets are to be used.

The method may use the specification to deploy files that are used to define the application specified therein. An advantage of this is that additional effort (such as compilation, assembling, etc.) is not required in order to provide a working application. Once components of the application have been provided they are run in the run time environment and in such embodiments there is no need to provide compilers, etc. in order to generate code for execution. Therefore, such methods should be less prone to error, allow easier maintenance of the application, be quicker to develop, etc.

The files specifying the application may be XML files. XML files are convenient because XML is becoming widely available and as such is becoming readily understood. Further, the XML files may be able to more readily receive and process XML data which is becoming more common. However, the method may comprise deploying nodes and/or node layers that can receive and process data that is non XML.

Conveniently, the method provides a graphical tool that allows a user to specify the application, including specifying the specification. Such a method may increase the ease of use of the system. The skilled person will appreciate the proliferation and acceptance of Graphical User Interfaces which may be due to their ease of use. A graphical tool may be readily deployable on such GUI's and also more convenient than for example a command line for a user to use.

The graphical tool may allow a user to select components from a library. The components may comprise any of the following non-exhaustive list: nodes; node layers; specification; patterns; messages; rule sets; style sheets (which may be XML); schemas (which may be XML). As discussed above, the messages and rule sets may be thought of as assets of the node. Further, the style sheets and schemas may also be thought of as assets of a node.

Further, the graphical tool may allow a user to specify how the patterns and/or nodes interact with one another.

The specification may be created and/or edited by the graphical tool.

Further, the graphical tool may allow a user to edit or otherwise manipulate the rule sets and/or other assets.

Conveniently, the method provides a run time environment that allows the specification to be processed to provide the application. The specification may contain any of the following non-exhaustive list: nodes, patterns, assets. Preferably, the run time environment processes the files created and/or deployed by the method. Such an environment is advantageous because it may provide for faster modification of the application. For example, modification may be made to one or more of the run time files which can then be used by the run time environment to produce the modified application. Prior art solutions would generally need recompiling, etc. in order to change the application. It is therefore likely that the method is generally quicker to modify the application than the prior art.

According to a second aspect of the invention there is provided a computer system arranged to create an application; said system comprising a node creation means arranged to create a definition specifying one or more nodes, each node being capable of processing data according to a set of predetermined rules and generating an output therefrom, the system further comprising a linking means capable of connecting one or more nodes such that data can pass between the nodes and being arranged to interact with the node creation means to modify the definition and a deployment means arranged to deploy the application from the definition created by the node creation means and the linking means, wherein the deployment means deploys the application according to a specification defined by a specification means.

An advantage of such a system is that it may provide for faster development of applications than prior art arrangements.

The system will generally comprise one or more processors capable of processing the definition deployed by the node creation means and the linking means.

The linking means may be arranged to deploy the definition allowing nodes running on the same processor(s) within a single processing apparatus.

The computer system may comprise a plurality of processing apparatus, each remote from the other, and having a connection therebetween capable of transmitting data between the processing apparatus. In such an arrangement the linking means may be arranged to deploy the definition allowing nodes provided by the definition running on processors in processing apparatus remote from one another. Such an arrangement is convenient since it makes the computer system scaleable and simplifies the running of an application across a number of pieces of processing apparatus.

Conveniently the deployment means deploys the definition that causes the nodes to communicate with one another using HTTP, direct memory protocols or other suitable protocols. Such an arrangement is convenient because it allows the nodes to communicate using standard protocols, perhaps making them widely useable and understood.

The node creation means may be arranged to utilise pre-determined and/or pre-written definitions in order to reduce the time and effort required to create the application. The pre-written definition may be provided in one or more libraries. This will also generally be less error prone and provides better integrity and future maintenance when compared to causing the node creation means to create the definition for each of the nodes.

The computer system may comprise a pattern creation means arranged to create patterns of nodes. Such patterns may make it convenient for a user to create the application since it may reduce the work involved in creating the nodes. For example, if a pattern of a plurality of nodes is repeated within the application then by repeating the pattern the work involved in creating each of the nodes within the pattern is likely to be reduced.

Conveniently a pattern cloning means arranged to clone a pattern of nodes is provided. Such an arrangement may speed the creation of the application.

Preferably, the computer system comprises a rule creation means arranged to allow the predetermined rules to be created and/or edited. Such an arrangement is convenient because it allows the functionality of a node to be altered since it is the rules that govern how data received by the node is processed.

The computer system conveniently comprises one or more of the following: a node storage means; a pattern storage means; a rule storage means.

The second aspect of the invention may have any of the features discussed in relation to the first aspect of the invention.

According to a third aspect of the invention there is provided a machine readable medium containing instructions which when read onto a computer cause that computer to perform the method of the first aspect of the invention.

According to a fourth aspect of the invention there is provided a machine readable medium containing instructions which when read onto a computer cause that computer to function as the computer according to the second aspect of the invention.

According to a fifth aspect of the invention there is provided a data-structure comprising a plurality of XML files and in particular comprising a specification file and a plurality of asset files the asset files being capable of interacting with one another and the specification file determining how the asset files interact with one another to provide an application having a predetermined functionality.

According to a sixth aspect of the invention there is provided a machine readable medium containing instructions that provide the data structure according to the fifth aspect of the invention.

According to a seventh aspect of the invention there is provided a method of implementing an application comprising:
  creating a plurality of nodes each node being capable of receiving data, processing that data according to a set of predetermined rules and making an output;
  interconnecting the plurality of nodes such that data input to the application is processed by one or more of the nodes and if further processing is required, forwarded to other nodes for that further processing.

According to an eighth aspect of the invention there is provided a method of creating an application, generally defined in software, the method comprising providing an XML file defining a specification and one or more assets used by the specification, providing one or more nodes each defined by XML and which interact with each other and/or the assets according to the specification in order to process data to provide the application.

The nodes may be provided by separate XML files. However, in alternative embodiments the nodes may be defined by the file providing the specification. It is generally desirable to provide them as a separate file to avoid the creation of lengthy files that are cumbersome to amend and upkeep.

The features discussed in relation to any other aspects of the invention may be applicable to the eighth aspects of the invention.

According to a ninth aspect of the invention there is provided a machine readable medium containing instructions that provide the data structure according to the fifth aspect of the invention.

According to a tenth aspect of the invention there is provided a computer system comprising a memory and processing means arranged to process instructions held in the memory wherein the memory is arranged to hold one or more files containing data, generally in XML format, at least one of the or each files defining a specification, further, at least one of the files defining a node capable of processing data and the specification being arranged to define how that node should process data.

According to an eleventh aspect of the invention there is provided a processing apparatus having a processor and memory the memory containing both program code and data wherein the program code and the data are substantially written in the same language.

Such an apparatus is advantageous because it may provide the ability to develop new applications using less program code than prior art systems.

The memory may hold presentation data specifying how output from the apparatus should be presented, the presentation data being held in the same format as the program code and the data.

In a preferred embodiment the program code and the data may be written in XML.

The processor may have a kernel running thereon which is preferable written in a platform independent language. Such a platform independent language is preferred since it will allow the kernel to be readily ported to a number of different platforms. In one embodiment the kernel is written in Java and a Java Virtual Machine (JVM) is provided on the apparatus in order to run the kernel.

The machine readable medium of any of the aspects of the invention may be any one or more of the following: a floppy disk; a CDROM/RAM; a DVD ROM/RAM (including +R/+RW, −R/−RW); any form of magneto optical disk; a hard drive; a memory; a transmitted signal (including an internet download, file transfer, or the like); a wire; or any other form of medium.

BRIEF DESCRIPTION OF THE DRAWINGS

Embodiments of the invention will now be described by way of example only and with reference to the figures of which:

FIG. 8 to 30 show screenshots that may be displayed by the computer system of FIG. 1.

DETAILED DESCRIPTION OF THE INVENTION

Figure 1:
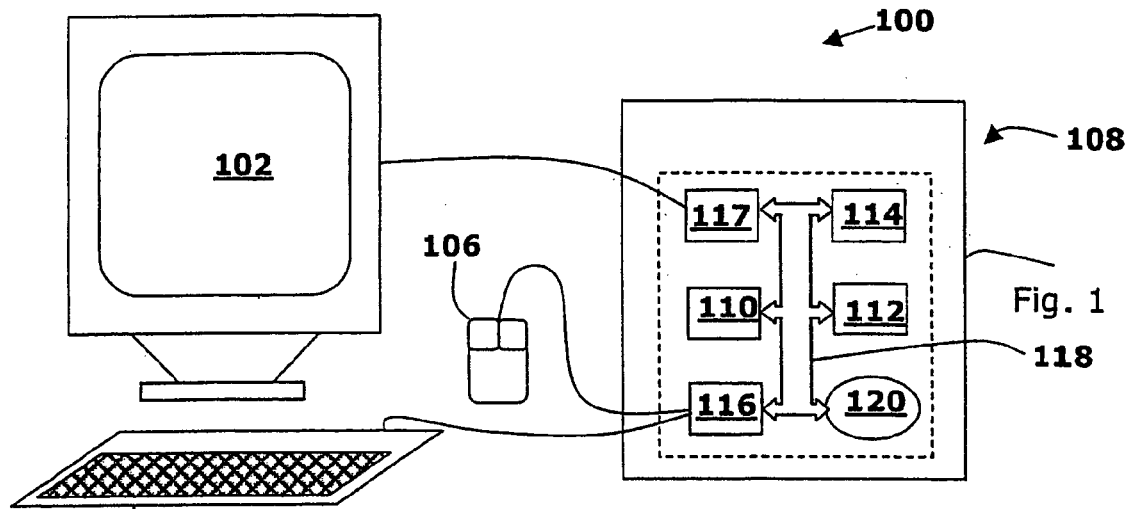
FIG. 1 shows a computer system arranged to carry out one or more embodiments of the present invention.

FIG. 1 shows a computer 100 arranged to accept data and to process that data. The computer 100 comprises a display means 102, in this case a Cathode Ray Tube (CRT) display, a keyboard 104, a mouse 106 and processing circuitry 108. It will be appreciated that other display means such as LEP (Light Emitting Polymer), LCD (liquid crystal display), projectors, televisions and the like may be equally possible.

The processing circuitry 108 comprises a processing means 110, a hard drive 112 (containing a store of data), memory 114 (RAM and ROM), an I/O subsystem 116 and a display driver 117 which all communicate with one another, as is known in the art, via a system bus 118. The processing mean 110 typically comprises at least one INTEL™ PENTIUM™ series processor, (although it is of course possible for other processors to be used) and performs calculations on data. The other processors may include processors such as the AMD™ ATHLON™, POWERPC™, DIGITAL™ ALPHA™, and the like.

The hard drive 112 is used as mass storage for programs and other data. The memory 114 is described in greater detail below and with reference to FIG. 2.

Other devices such as CDROMS, DVD ROMS, scanners, etc. could be coupled to the system bus 118 and allow for storage of data, communication with other computers over a network, etc.

The I/O (Input/Output) subsystem 116 is arranged to receive inputs from the keyboard 104 and from the processing means 110 and may allow communication from other external and/or internal devices. The display driver 117 allows the processing means 110 do display information on the display 102.

The processing circuitry 108 further comprises a transmitting/receiving means 120, which is arranged to allow the processing circuitry 108 to communicate with a network. The transmitting/receiving means 120 also communicates with the processing circuitry 108 via the bus 118.

The processing circuitry 108 could have the architecture known as a PC, originally based on the IBM™ specification, but could equally have other architectures. The server may be an APPLE™, or may be a RISC system, and may run a variety of operating systems (perhaps HP-UX, LINUX, UNIX, MICROSOFT™ NT, AIX™, or the like). The processing circuitry 108 may also be provided by devices such as Personal Digital Assistants (PDA's), mainframes, telephones, televisions, watches or the like.

Figure 2:
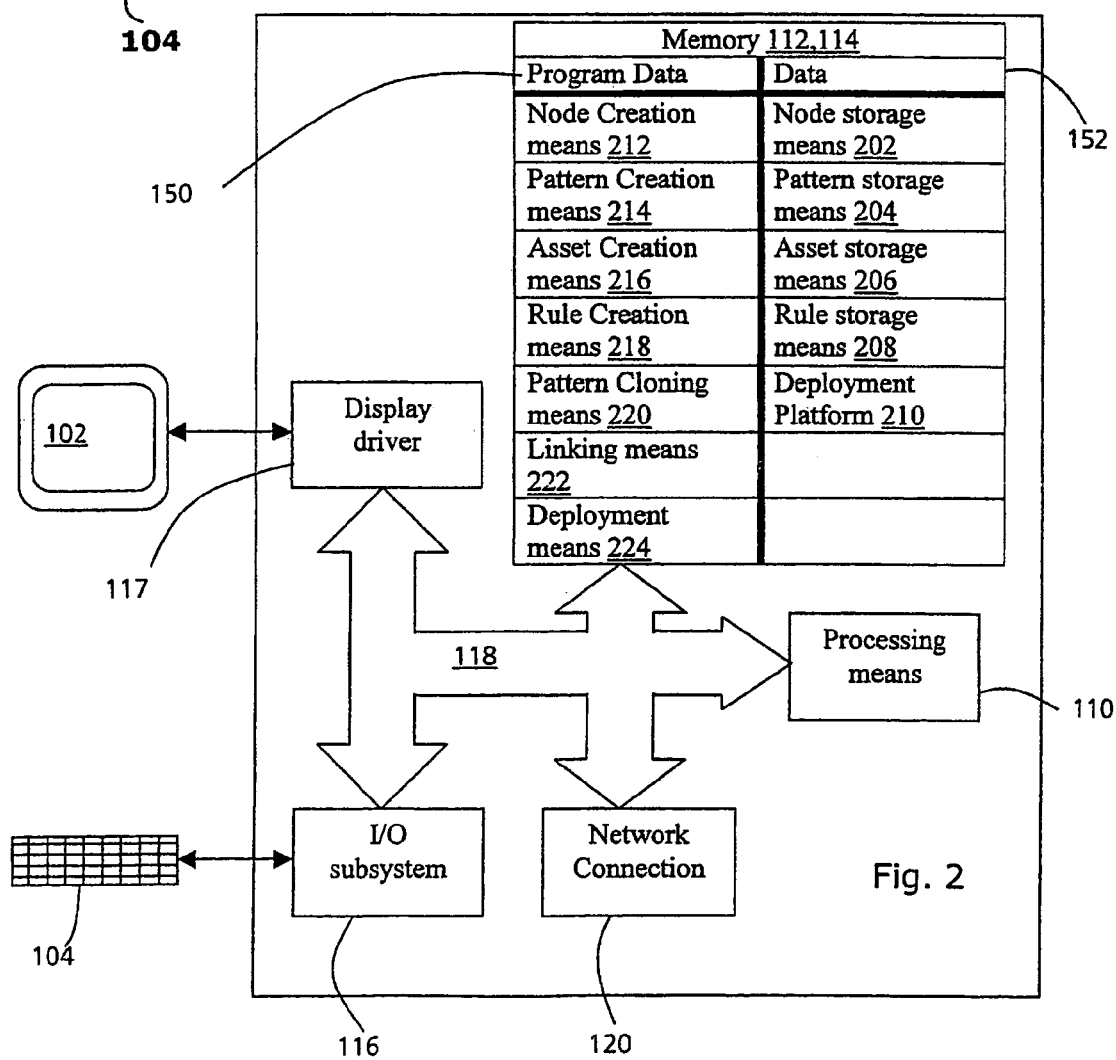
FIG. 2 shows detail of the memory of the computer system of FIG. 1.

FIG. 2 shows the memory 114 of the computer 100 of FIG. 1 in greater detail. It will be appreciated that although reference is made to a memory 114 it is possible that the memory could be provided by a variety of devices. For example, the memory may be provided by a cache memory, a RAM memory, a local mass storage device such as the hard disk 112, any of these connected to the processing circuitry 108 over a network connection such as via the transmitting/receiving means 120. However, the processing means 110 can access the memory via the system bus 118 to access program code to instruct it what steps to perform and also to access the data samples. The processing means 110 then processes the data samples as outlined by the program code.

The memory 114 is used to hold instructions that are being executed, such as program code, etc., and contains a program storage portion 150 allocated to program storage. The program storage portion 150 is used to hold program code that can be used to cause the processing means 110 to perform predetermined actions.

The memory 114 also comprises a data portion 152 allocated to holding data and in embodiments of the present invention in particular provides a Node storage means 202, Pattern storage means 204, Asset storage means 206, and a Rule storage means 208. The function of these will be expanded upon hereinafter.

In this embodiment, the program code stored in the data portion 152 includes a Node Creation means 212, Pattern Creation means 214, an Asset Creation means 216, a Rule Creation means 218, a Pattern Cloning means 220, a Linking means 222 and a Deployment means 224. Again, the function of these will be expanded upon hereinafter.

Figure 3:
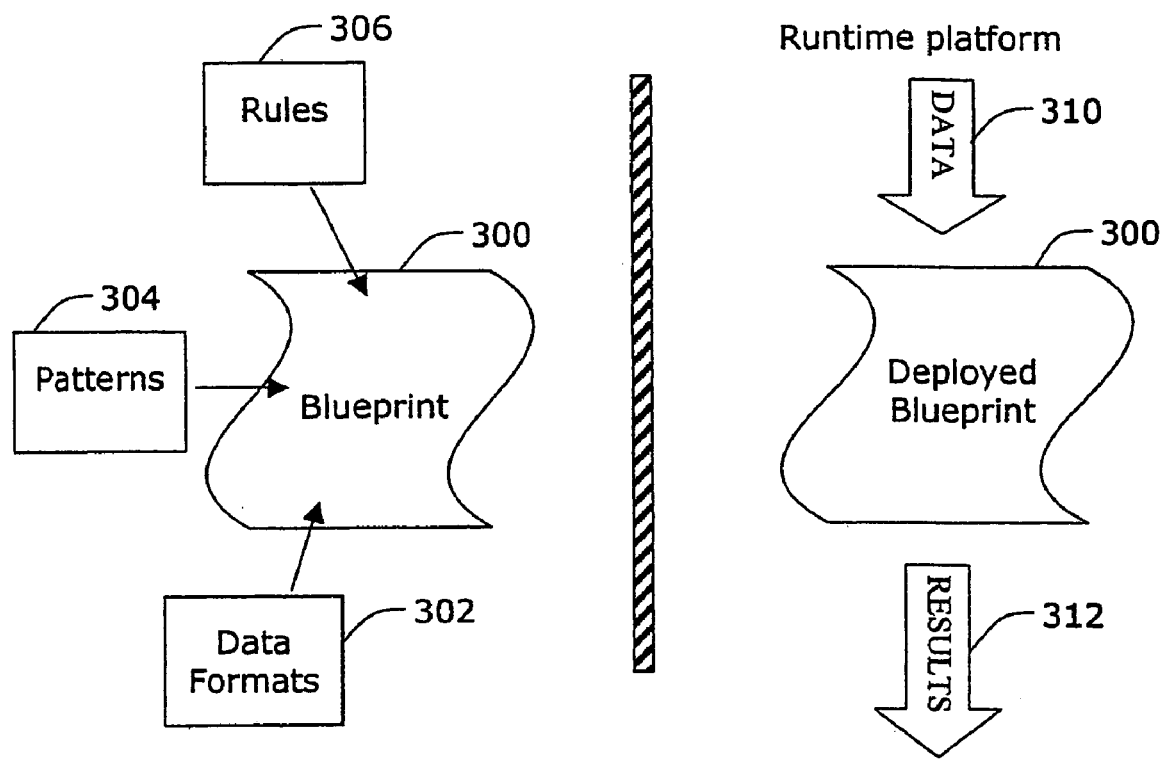
FIG. 3 shows a conceptual overview of one embodiment of the present invention.

FIG. 3 gives an overview of the one aspect of the present invention. Implementation of a system is divided into two stages—the design stage and the deployment stage. In the design stage, the system developer develops an application specification which may be thought of as a blueprint 300. This comprises information relating to the format of data that will be accepted by the system (data formats 302), the expected processes to be performed in terms of the patterns of interaction between software and/or hardware elements of the system (patterns 303) and the rules governing those processes (rules 304).

The deployment stage is effectively the specification 300 in action, i.e. the specification 300 in use in the real world. In deployment, the specification 300 is applied to a run time environment, which in this example comprises the programming language such as Java, data representation of text and communicating using protocols such as http and XML. The skilled person will be familiar with these languages, which can be noted for their suitability for use in conjunction with the Internet and their cross platform usability (i.e. their ability to run on a variety of different computers and operating systems). Equally, the skilled person will be familiar with the concept of a platform being the underlining software and/or hardware for a system.

Figure 4:
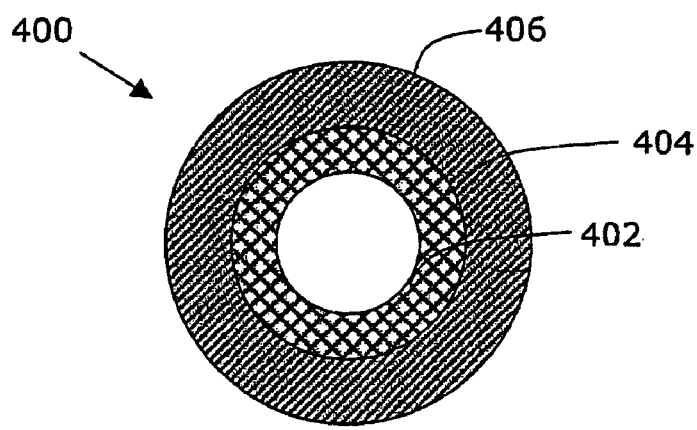
FIG. 4 shows a conceptual representation of a node according to one embodiment of the present invention.

FIG. 4 shows an example of a Node 400 which is defined by a definition which may have been generated by the node creation means. One or more and generally a plurality of such nodes are suitable for forming a system according to the invention. Nodes 400 are arranged to interact with each other using messages written in XML, which may be referred to as XML messages.

The code shown in the appendices is written in XML (extensible Mark-up Language). XML requires pairs of tags to be placed within a document. Theses tags do not specify how the information should be presented but specify the content of the information between the pairs of tags. The skilled person will fully understand XML, but a full description can be found at http://www.w3.org, and the brief description below will aid his/her understanding.

The skilled person will appreciate how an XML document is structured: written in words, or data sub-items, which are collected into data sub-item groups. The data sub-item groups can comprise sentences, paragraphs, or simply collections of words. The data sub-item groups, or even just data sub-items, are placed between pairs of tags.

The tags appear as follows: <variable>, and </variable>, with variable being any word, or character string acceptable according to the XML recommendation. Further, each data sub item group can be itself broken down into a number of sub-items. This structure is convenient and allows for easy manipulation and searching of the complete data item.

Each Node is provided by a logical definition. Properties of a node include an identifier, name, and description. Each Node has at least one information receptor but may have more. Each receptor is dedicated to a particular type of information. By default each node has at least one receptor capable of receiving any XML information. Additional receptors can be used to process any non-XML information, including but not limited to standard, flat, information streams and binary data. Each node is defined by a separate XML file held in the memory 114 and in particular within the node storage means 202. As the skilled person will appreciate it is equally possible to specify components of the system in fragment of a file. The two extremes may be thought of specifying each component in a separate file and specify all of the components as a fragment within a single file. Embodiments of this invention may take any position between these two extremes. The components may comprise any of the following non-exhaustive list: specification; nodes; node layers; patterns; messages; rule sets; style sheets (which may be XML); schemas (which may be XML).

The receptors enable a node to receive information. After receiving information via the receptors, nodes can use information processing logic to process that information. The logic can take different forms. The incoming information is assumed to be XML by default. For XML information the default form of logic is context-sensitive rules that are activated by the information received. This logic is executed by a forward-chaining rules engine. The logic itself is represented in XML format. If the incoming information is not XML, then logic dedicated to the information format can be used by the node. This dedicated logic can be in the form of scripts or compiled Third Generation Language (3GL) programs such as JAVA. The context sensitive logic can be executed conditionally, based on the incoming information. Conditions may be based on XML tags, values or structures.

As the logic is executed, factual information is derived therefrom. This information is stored in working memory 112,114. If any part of this information is required beyond a single invocation of the node then it can be placed in a cache. During logic execution, additional resources can be used. These resources can be in various formats, including XML, XSL, XSD, text, graphics, etc. For XML information, an extensible set of operations is available for the input, output and manipulation of XML information. Examples of these operations include, Read, Write, Transform, Copy, Service Call, etc.

The incoming information, the logic and the additional resources that are used during node execution are all defined separately and have no knowledge of the context in which they will be used. This enables the same information, logic and resources to be used with different nodes. The information, logic and resources are also location transparent and can be situated anywhere, so long as they are accessible using URL syntax. This also enables the transportation of information, the logic to process the information and any additional resources that are required over the Internet Protocol (HTTP), enable mobile information and logic with autonomous processing capabilities.

Within each node, and as described further below, messages received by the node are inspected and decisions made based on their content. Based on these decisions, other nodes 400 may be contacted. To accomplish this, each node 400 comprises (on a conceptual level) three layers as are now described. In other embodiments, each layer could comprise another number of layers. Each of these layers is represented by the one of the three concentric circles 402, 404, 406 of FIG. 4.

The first, innermost, layer is a rule processing, or logic, engine 402 and comprises a 'forward chaining' logic engine. The engine uses XML rule sets to make decisions based on the content of the incoming XML messages. The decisions may include triggering messages or calls to other nodes or changing the content of the messages. A consequence of writing both the message and the rule sets in XML is that the system can be configured dynamically—i.e. there is no need to compile code every time a change is made to the system. This will be expanded upon later. In situations where native XML is insufficient custom engines can be developed using means such as Java classes.

The second, middle, layer may be thought of as an agent 404 which acts as a message transceiver arranged to send and receive messages to other nodes to which this node is connected. The message transceiver 404 is arranged, respectively, to send and receive the XML messages to and from other message transceivers 404. Message transceivers 404 are capable of discovering the location of others at runtime when the nodes are executed in the run time environment, in a manner similar to hosts on a peer-to-peer network. As will be appreciated from FIG. 4, the message transceiver 404 may be thought of as containing and/or using the rule processing engine 402. The message transceivers 404 can be deployed locally within a Java Virtual Machine (JVM) as native Java services or may be deployed using the third layer 406 as a means such as a web service. Thus, the message transceiver may be thought of as an intelligent software agent which is capable of reacting to the content of the incoming messages to be able to function. The rules are triggered by trigger data within the messages that are specific to the rule; if there is no trigger data within a message then none of the rules will trigger. However, the message transceiver will continue to function if no rules trigger and therefore, the message transceiver can accept messages in any format although no action may occur if the message does not contain any trigger data for the rules.

The third layer is a gateway 406, arranged to provide access to the node 400 over a variety of protocols (for example HTTP, Java and the like). This third layer may be thought of as a transport layer arranged to receive and send data to and from the node. A message transceiver 404 uses its associated gateway 406 to locate and send messages to and from other message transceivers 404. Further, external message transceivers 404 use the gateway 406 to locate the associated message transceiver 404.

The rule processing engine 402, the message transceiver 404 and the gateway 406 are separable from each other in that each of the layers (for example the rule processing engine 402) may be replaced by another version of that layer, causing the node 400 to work in a different way when compared to a node having a different combination of layers. Each layer is therefore chosen according to the intended purpose of the node 400. The node 400 may for example be arranged to process customer orders, it may be arranged to model a cell in a biological system, it may be arranged to provide a web based service, etc. The node 400 can be programmed to perform any functions and need only be provided with appropriate layers 402, 404, 406.

In this particular embodiment each of the rule processing engine 402, the message transceiver 404 and the gateway 406 are provided by separate XML files. The identities of these files is specified within the specification 300 such that run time environment can access the respective files when required. It will be appreciated that in other embodiments the components of a node may be merged into a single file or into other combinations. However, the location of the components would be specified within the specification 300 such that the run time environment could locate each component.

Figure 5:
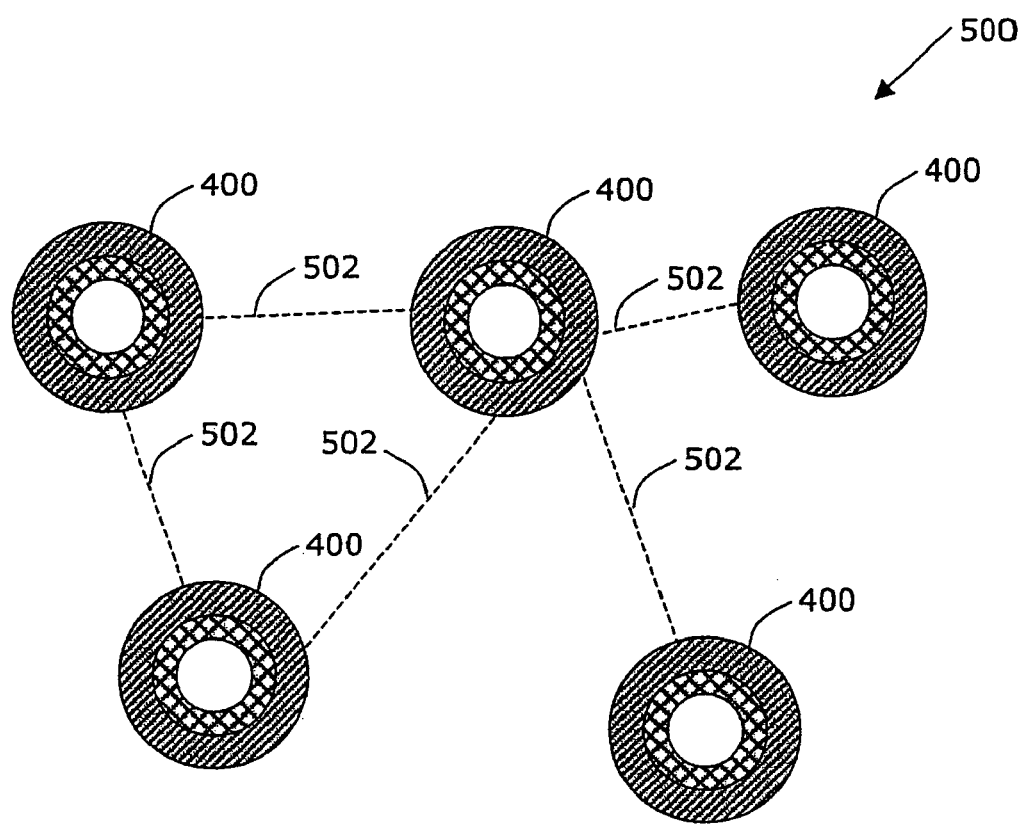
FIG. 5 shows a conceptual representation of a pattern of nodes according to one embodiment of the present invention.

As is shown in FIG. 5, nodes 400 are arranged in a pattern 500 to form all or part of a system. A pattern comprises one or more interacting nodes 400 with defined relationships between them. The nodes 400 in a pattern are capable of exchanging XML messages via communication links 502. Nodes 400 may be run on the same processing circuitry 108 and links 502 between such nodes 400 may be thought of as virtual links. Alternatively, or additionally, the nodes 400 may be run on different processing circuitry 108 and such links 502 may correspond to a connection between two processing circuits 108. The specification 300 may be used to determine the location at which the node will run.

Each node is autonomous and has no knowledge of its surroundings. During the execution of logic, if a node encounters the need to call another node, it refers to its Pattern which provides information as to where that node 400 is connected. A pattern defines which nodes can call other nodes and using which information receptors. The aim of a pattern is to encapsulate a set of interacting nodes that perform a higher-level function. A pattern can contain any number of nodes, depending on the application context.

The specification 300 that has been created defines patterns of interaction between message transceivers. The interaction is not specified and it is merely noted that it is likely to occur. To give an example, message transceivers may be provided to simulate a wall, a floor and a door. The patterns of interaction may be that the floor is attached to a bottom region of the walls. The pattern of interaction for the door is that it is likely that the door will be provided in a wall; the position of the door within the wall is not specified.

There are two types of patterns, logical and physical. The logical patterns define the nodes and their relationships. The physical patterns also define the information, logic and resources the nodes can use and the exact physical manifestation of each node. For example, a node may be represented by a script, a 3GL program or some other mechanism. The pattern definitions are also stored in XML format.

Pattern splicing enables multiple patterns to be joined together to perform yet higher level functions. The patterns are spliced by creating a link between two nodes residing in different patterns. This splicing information is contained in the specification 300.

A specification 300 provides context to the abstract definition of nodes and patterns. A specification 300 defines, categorises and constrains the way in which patterns can be spliced together. A specification 300 categorises information, logic, resources and physical patterns. It also defines the architectural layers, which different categories of patterns must reside within as well as the splicing information for pattern connections. The specification 300 are also stored in XML format.

The nodes 400 process rules. In the deployment stage, the rules are held within the innermost layer: the rule processing engine 402. In the design stage, they are held in the Rule storage means 208 which acts as a repository. In this embodiment the rules follow a structure that is intuitive for a user to understand: <event>-<condition>-<action>. The rules are only fired if the <condition> is satisfied by the incoming <event> content, which may be thought of as trigger data, of the XML message received by the message transceiver 404 (which may be a business document or the like).

It will be appreciated that some rules will not be able to execute with the information that is currently available and may require other additional information before they can execute. For example, consider the rule: Only sell shares if the price is greater than £x. This rule cannot execute unless the price of those shares is known. A second rule is therefore required that acquires the price of the shares. The first rule references the second through use of the XPath language; a non-XML language that is used to identify parts of XML documents. Through use of the XPath references the first rule is triggered when the second rule is fired; i.e. in this example, when the share prices are available the first is triggered to determine whether the shares should be sold. The concept of forward-chaining rules in this manner will be well understood by the skilled person.

In summary of the above, each specification 300 therefore encapsulates, patterns spliced together. Patterns contain interacting nodes, which consume and process incoming information and additional resources. This constitutes a specification. A blueprint can therefore be perceived as a specification consisting of a collection of native XML documents. In one embodiment XML documents are provided for the assets as defined in the specification which may comprise any of the following: a rule; a rule set; a message; a style sheet; a schema.

It may be efficient to define certain assets within the specification 300 rather than in a separate XML file (or portion of an XML file) if the asset is to be used by a plurality of other components (such as a node or a pattern, etc.). If a system comprise 50 000 nodes, each of which could require a common message, it would be efficient to define that message within the specification 300 rather than in a separate XML file (or a portion of an XML file).

A graphical tool is provided that allows a user to develop all of the components of the application. In this sense a component may be thought of as any of the following: a node, a layer of a node, a rule, a rule set, a message, a pattern, an asset, a schema, a style sheet, a specification. Once all of the components of the application have been created then they can be deployed using the run time environment. Unlike prior art systems and methods this deployment does not require extra processing such as compilation or assembly and the components are simply processed by the run time environment.

Deployment comprises causing the Deployment means 224 to access the components and process them accordingly. The deployed specification 300 can process data 310 provided to the system as an input and provide a result 312 as an output.

For the remainder of this description, and as only one example of the many possible applications for this system, an application relating to car manufacture is used. It should however be clearly understood that the present invention is not limited to the field of controlling business processes. It may, as in the examples given above, be used to monitor or model reactions in a nuclear power station, biological systems, flow rates, etc. It may in fact be applied to any situation in which a software system is, or may be, of use. It will be appreciated that the screen shots provided in FIGS. 8 to 30 provide portions of the graphical tool that in this embodiment is used to create and deploy the application.

Figure 6:
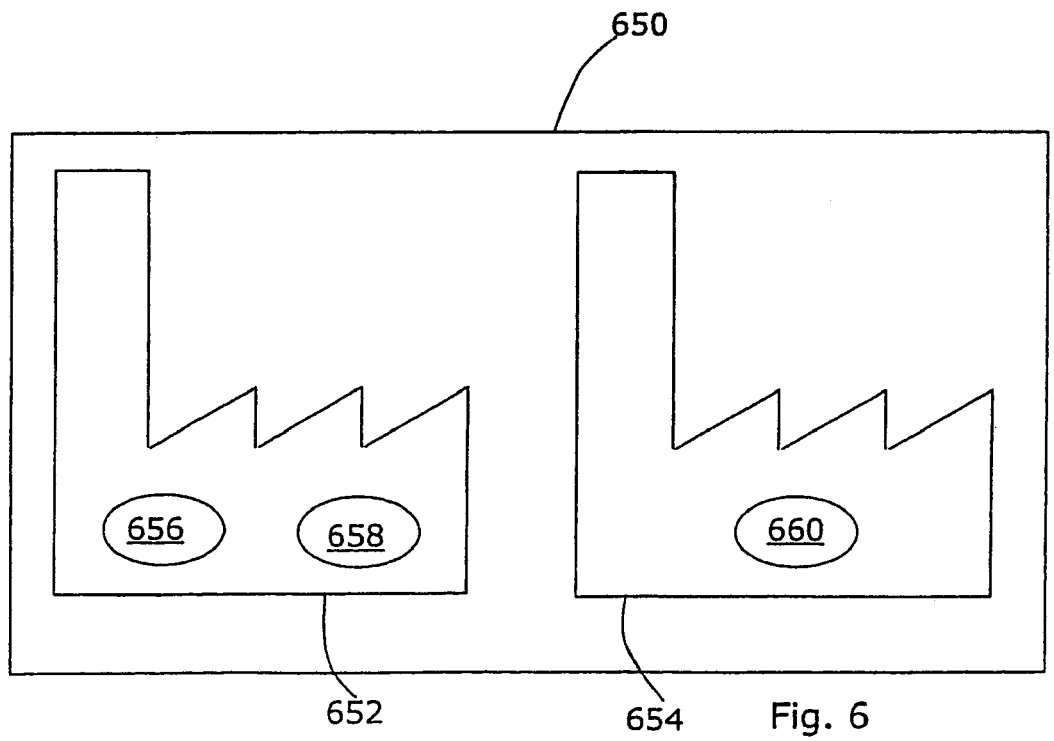
FIG. 6 shows an example of a situation to which an embodiment of the present invention may be applied.

In this example as shown in FIG. 6, a bespoke system is being devised for a company called HyCar 650, which provides various models and colours of cars. HyCar 650 principally comprises a manufacturer called HyCarManufacturer 652 and a distributor, called HyCarDistributor 654. Together, these two businesses can be thought of as comprising a collaborative network, labelled HyCarNetwork 650.

HyCarManufacturer 652 provides an Order Processing Service 656 for ordering cars. It also has a Fulfilment Process 658 for fulfilling the order. The fulfilment process validates the order, checks stock availability, schedules production, or raises a shipping note, raises an invoice, and updates the Distributor on progress.

HyCarDistributor 654 has an eProcurement Service 660 for placing orders to car manufacturers.

A specification 300 to model this situation is constructed in four levels. The levels are Business Networks, (representing networks of businesses interacting, e.g. a marketplace of buyers and sellers), Businesses, (representing individual businesses), Services (representing the services offered by Businesses) and Processes (representing internal business processes).

In this example, there is one Business Network—The HyCarNetwork 650. There are two Businesses: HyCarManufacturer 652 and HyCarDistributor 654. HyCarManufacturer 652 offers a Service (the Order Processing Service) 656 and an internal Process (the Fulfilment Process) 658. HyCarDistributor 654 has a Service (the eProcurement Service) 660.

Figure 7:
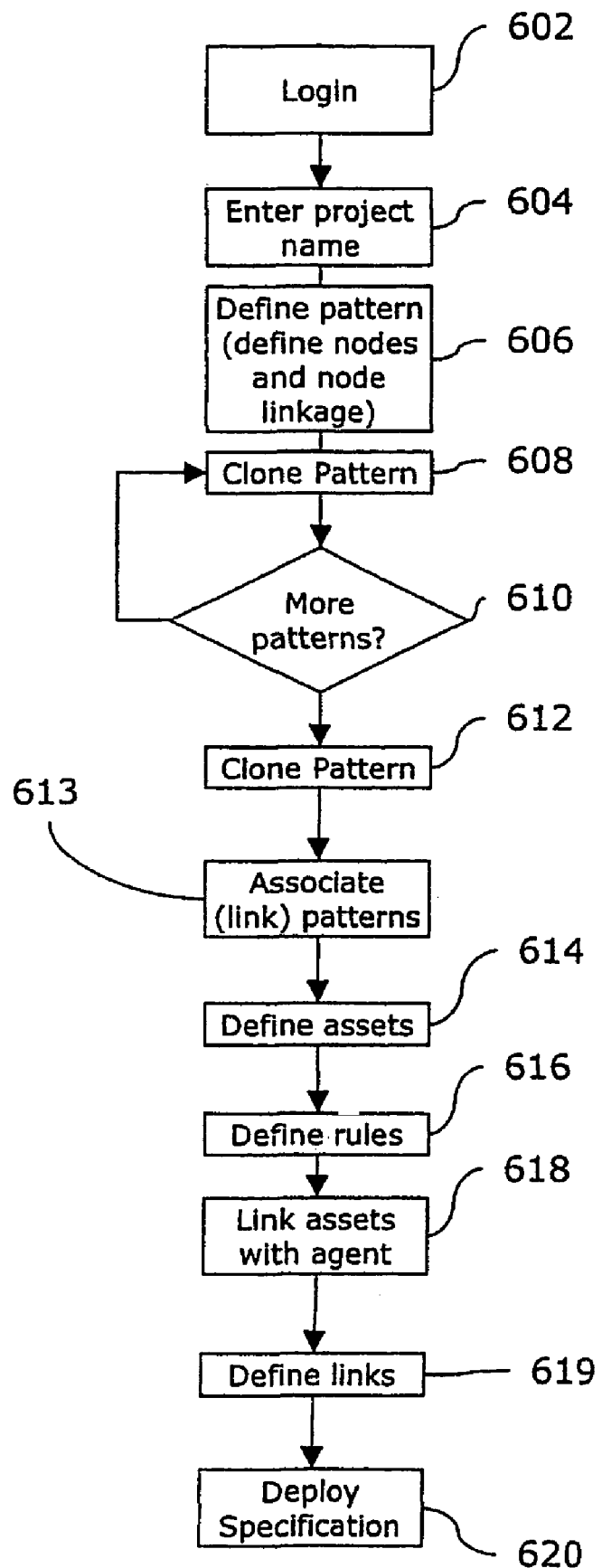
FIG. 7 shows a flowchart giving an overview of one embodiment of the present invention.

A use of the system is now described with reference to the flow chart of FIG. 7 and the screenshots of FIGS. 8 to 30.

Figure 8:
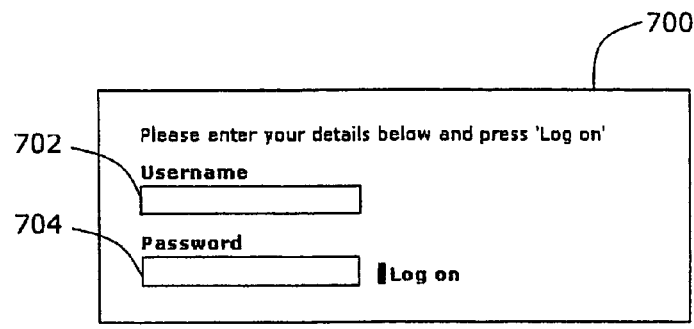

FIG. 8 shows a Login screenshot 700, which is displayed on the display means 102, providing a Username entry box 702 and a Password entry box 704 both of which must be filled in to provide access to the system. Such a log in screenshot 700 will be familiar to those in the art.

It will be appreciated that this screenshot and others yet to be defined are provided by a Graphical User Interface (GUI's). A user of the system uses the keyboard 104 and the mouse 106 to make inputs to the Username entry textbox 702 and the Password entry textbox 704 in step 602. The user thereby accesses the New Project screenshot 800 shown in FIG. 9, which comprise a Project Name entry box 802. Again, the user makes an appropriate input to the Project Name entry textbox 802 in step 604. In this example, the project is given the name 'example'.

Figure 10:
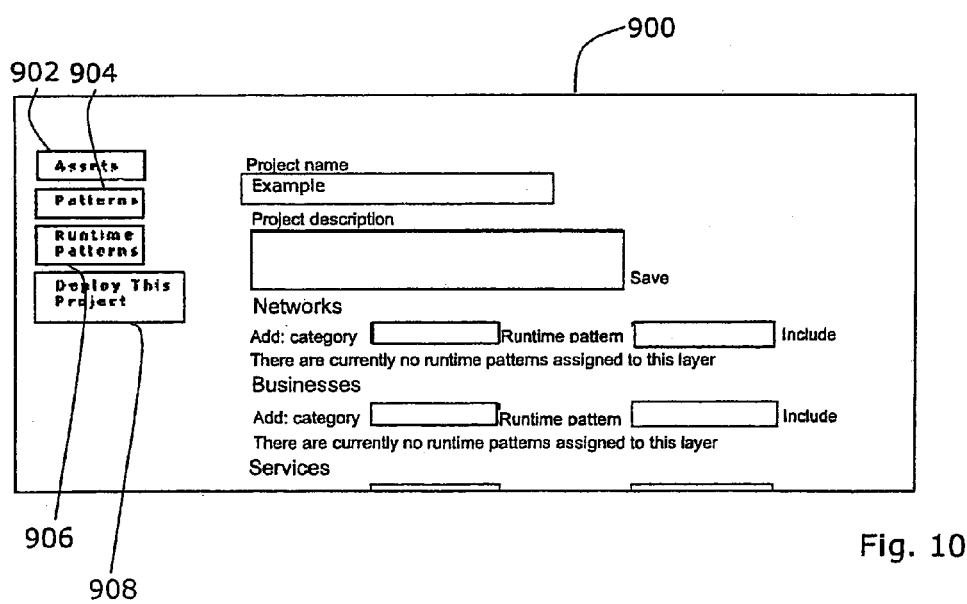
Figure 11:
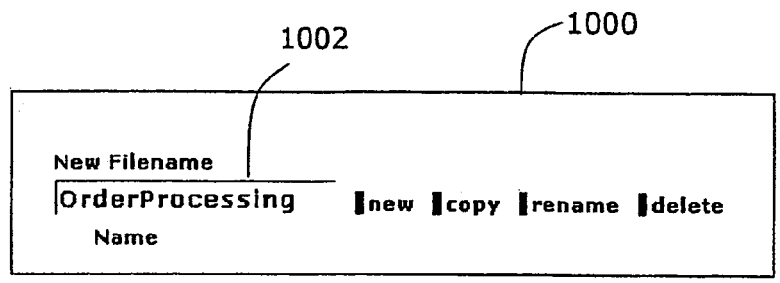

The user then progresses to the Design screenshot 900, a section of which is shown in FIG. 10.

The system development occurs in two stages and the first of these is to create patterns 500. These patterns 500 will be cloned to form runtime patterns and will exist within one of the above-defined four layers—Business Networks, Businesses, Services, and Processes. The second stage, as described below, is to create assets accessible to the patterns 500. It will be appreciated from FIG. 5 that a pattern is a collection of interconnected nodes 400.

The Design screenshot 900 comprises a display of the layers of the system and the patterns they are to contain at runtime. At this stage in the example, no patterns have been defined. The Design screenshot 900 further comprises navigation buttons (an Assets button 902, a Patterns button 904, a Runtime Patterns button 906 and a Deployment button 908). These buttons allow a user to navigate from one screen to another by positioning a pointer displayed on the display means 102 and controlled by the mouse 106 over a button and clicking in a manner familiar to those skilled in the art.

Clicking on the Patterns button 904 takes the user to screens that allow the patterns to be defined using the Pattern Creation means 214 in the Program data portion 150 of the memory 112, 114. In this example, a pattern to be associated with the Services layer is to be defined. A GUI providing a New Pattern screenshot 1000 in FIG. 11 allows a new pattern to be defined, in step 602. The New Pattern screenshot 1000 comprises a Pattern Name entry textbox 1002, in to which the user has entered a name for the pattern, which in this example is 'OrderProcessing', intended to provide the Order Processing Service 656 offered by HyCarManufacturer 652.

Figure 12:
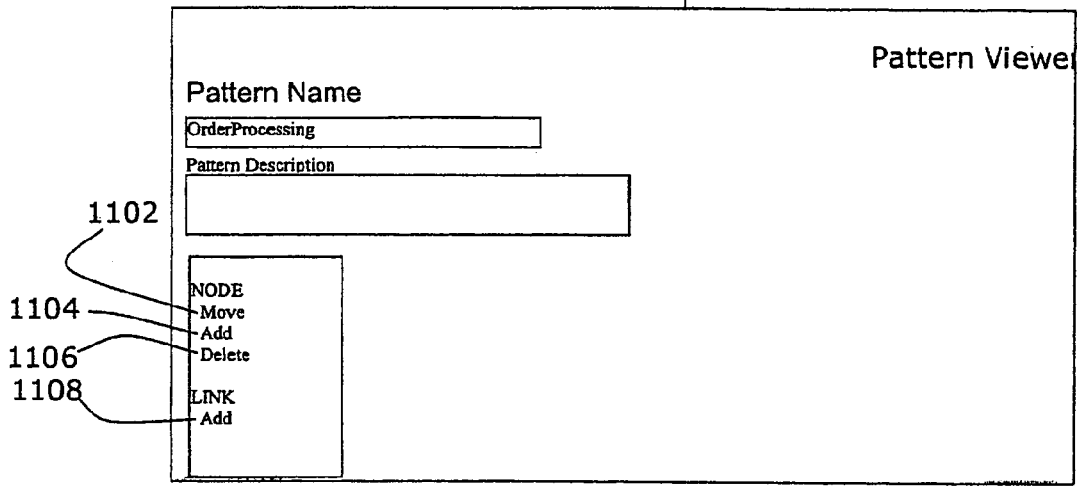
Figure 13:
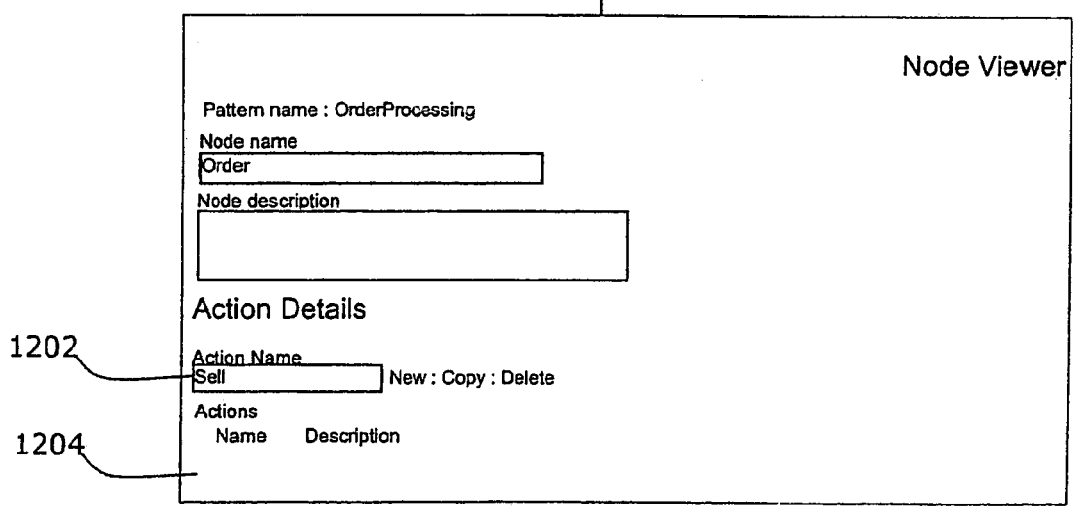
Figure 18:
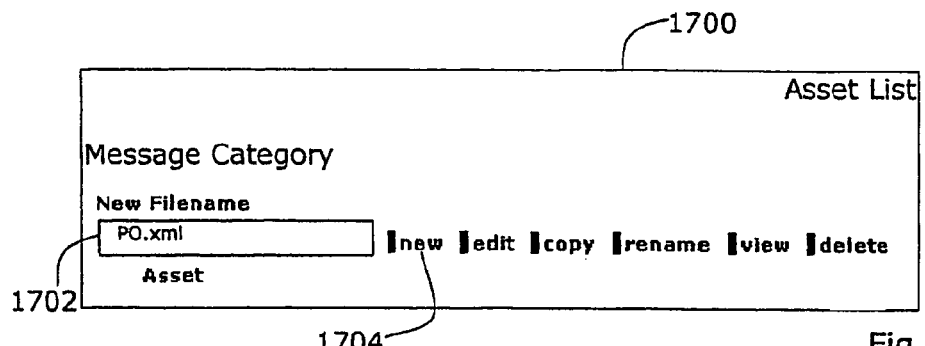
Figure 19:
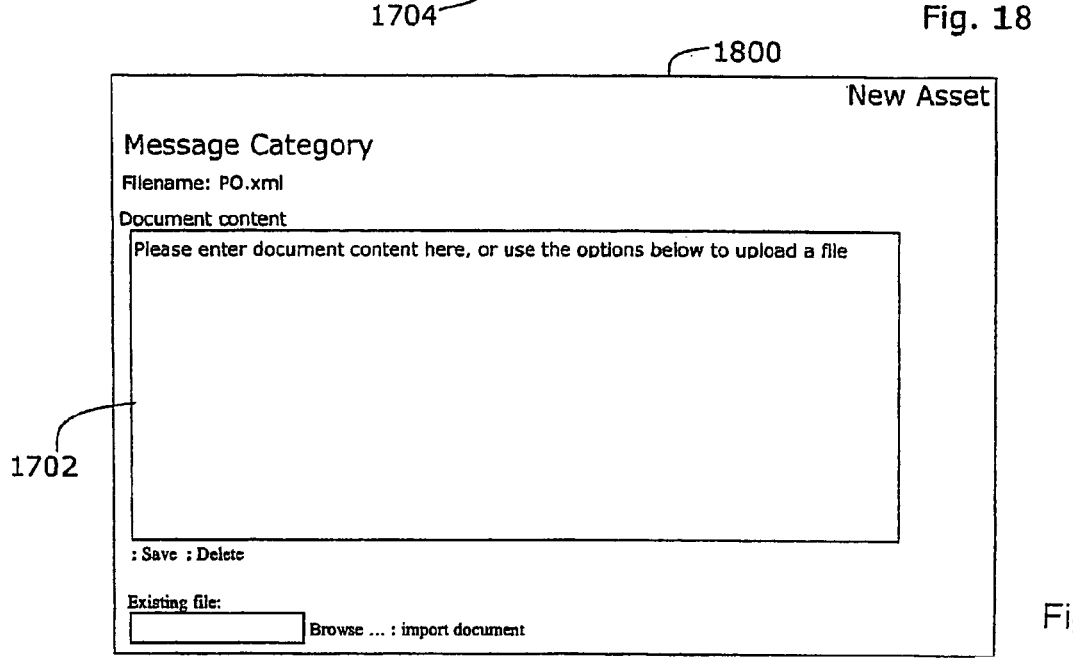

The user then progresses to a Pattern Viewer screenshot 1100 as is shown in FIG. 12. From this screenshot 1100, the user is able to arranged nodes 400 into patterns 500. To this end, the screenshot 1100 has a Move Node button 1002, an Add Node button 1104, a Delete Node button 1106 and an Add Link button 1108. However, no nodes 400 have yet been defined, so the user clicks the Add Node button 1104 to access the Node Creation means 214 and create a node using a Node Viewer screenshot 1200 shown in FIG. 13.

The Node Viewer screenshot 1200 comprises an Action Name entry box 1202 and an Action list 1204 (at present, no actions have been defined, so the list 1204 is empty). The user creates a new node, called 'Order' and a new action, labelled 'Sell'. What this action 'Sell' does is yet to be defined but will be defined in rules 304. The new node is stored in the Node storage means 202.

For the purposes of this example, the pattern is now complete and comprises this one node 400 'Order', arranged to carry out the action 'Sell'. The system uses the input information to build an XML file called 'OrderProcessing.XML' to represent the pattern OrderProcessing. A link between the Order node and the OrderProcessing pattern is created by the linking means 222. This pattern is stored in the Pattern Storage means 204 and is now ready to be 'cloned' by the Pattern Cloning means 220 in step 608 to form a runtime pattern as follows.

A Runtime pattern is created through clicking the Runtime Patterns button 906 on the Design screenshot 900 shown in FIG. 10. This allows a user to navigate to a screen, which is shown as a Runtime Patterns screenshot 1300 in FIG. 14. The screenshot 1300 provides an interface that allows the user to create a new Runtime Pattern called OrderProcessing (named using a runtime pattern name entry box 1302). The screenshot further comprises a Clone Pattern' button 1304. On clicking this button 1304, the user is presented with a screen as shown in FIG. 15.

FIG. 15 shows a Clone Base Pattern screenshot 1400. The Clone Base Pattern screenshot 1400 comprises a list 1402 of XML 'base' patterns that have previously been defined as XML files in the manner described above for the OrderProcessing pattern. In fact, as the OrderProcessing.XML pattern is the only base pattern defined, the list 1402 is limited to this alone. The Clone Base Pattern screenshot 1400 further comprises a Clone Pattern button 1404. Once a base pattern has been selected, the pattern is cloned when the user clicks on the Clone Pattern button 1404 to produce a runtime pattern called OrderProcessing.

When a base pattern is cloned, it creates a Runtime Pattern with the same structure as the base pattern. This means that the Runtime Pattern will contain all the nodes 400, actions (such as the action 'Sell' created above), and interactions defined for the pattern. In other systems, the list 1402 may further comprise generic patterns. These would provide a set of patterns that are likely to specify the best way of doing certain tasks. Cloning also creates associates a default (blank) rule set with the message transceiver called OrderProcessing_Order_rules.XML. This is utilised as described below.

Figure 9:
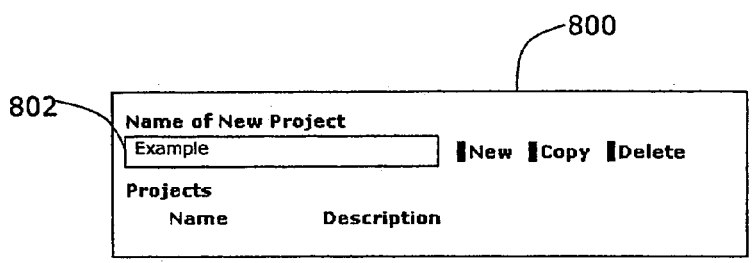

The Runtime Pattern OrderProcessing may then be added to the blue print using the GUI provided by the Design screenshot 900 shown in FIG. 9, a portion 1500 of which is shown in FIG. 16.

In order to complete the system for HyCar, it is considered, in step 610, if further patterns should be created. This is the case here, but these further patterns will not be described as exhaustively as the OrderProcessing Pattern. The skilled person will understand that they could be defined in a similar fashion using the GUI's (or other, similar GUI's) described above. It should be understood that a layer can be concrete or can be abstract. A concrete layer is one that can be implemented within the runtime environment. For example, a process or service, as described above, can be implemented within a concrete layer. Abstract layers provide context for the solution being modelled but cannot contain any runtime information. For example, a Business will never have a physical implementation in this example, but will provide context during modelling for the overall application. The following patterns would be created by the user and stored in the Pattern Storage means 204:

1. Business Network Pattern, from which HyCarNetwork can be modelled. For the purposes of this example, this pattern is called P2PMessagingHub. The pattern is abstract and has no nodes 400. The main processing will be conducted in the Service and Process layers. To do this, the user will click on the Patterns button 904 on the Design screenshot 900 shown in FIG. 9, and follow a 'Networks' link to a further GUI, which allows the name of the network to be entered as a New Filename box.
2. Seller Pattern representing the Business HyCarManufacturer. This pattern is abstract, having no nodes 400 and nothing further has to be done at this stage. This is done as above, with the exception that the user follows links to create a business instead of networks.
3. Buyer Pattern representing the business HyCarDistributor. This pattern is also abstract.
4. eProcurement Pattern representing HyCarDistributor's eProcurement Service. The Pattern has a single Node called OrderPlacement with a single action called buy.
5. OrderProcessing Pattern representing HyCarDistributor's order processing Service, as described above.
6. Fulfilment Pattern, representing Hycarmanufacturers validation process as described above.

The second stage in the development of the Specification 300 is to create assets for the patterns as defined above to use in step 612. The assets are created using the Asset Creation means 216 and, once created, exist in an 'Assets Pool' in the Asset Storage means 206. These Asset Pools are arranged to allow XML Assets to be categorised, stored, and re-used. The user needs to attach the relevant XML assets to the nodes for each Runtime Pattern. Examples of assets include:

1. Messages: These are definitions of the XML messages that will flow between nodes 400.
2. Schema: Schemas can be used to validate the content of XML messages entering nodes. Schemas provide information and data models that may have been agreed upon by industry consortiums.
3. Stylesheets: In this example, these are XSL Stylesheets. Many e-Business solutions will require transformations of incoming XML data to create the outgoing data. An example of this might be the transformation of a BASDA order request into the internal definition required for an existing order entry application. BASDA stands for Business Application Software Developers Association and is involved in setting international standards in document formats.
4. Rule set: These are XML rule sets and contain the Business Rules used by applications
5. Other Resources: With e-Business solutions there are often situations where other content is required. Some examples of this include configuration files, data-to-XML mappings, and process flow definitions.

Patterns are associated 613 with one another during development of the components of the application and this is an iterative step that is performed as and when required as the patterns become available.

The example of the figures continues with the creation of assets for the pattern OrderProcessing (step 614) and more specifically with a Message asset defining the content of a Purchase Order.

First, the user returns to the designs screenshot 900 shown in FIG. 9 and clicks on the Assets button 902. This provides access to the Assets Creation means 216. The user is then presented with an assets categories screenshot 1600 as is shown in FIG. 17. The assets categories screenshot 1600 comprises a rule set Category button 1602, a Message Category button 1604 and an Other Resources Category button 1606. The user clicks on the Message Category button 1604 and is presented with a GUI as shown in the New Message screenshot 1700 in FIG. 18.

The New Message screenshot 1700 comprises a Message Name entry box 1702, and a New Message button 1704. The user inputs the name of the new message into the Message Name entry box 1702, which in this case is 'PO.XML' (PO being an abbreviation of Purchase Order) and clicks the New Message button 1704. The user is then presented with the GUI as shown in a Message Content screenshot 1800 of FIG. 19.

The Message Content screenshot 1800 comprises a Document Content entry box. An example XML purchase order should be copied into this box. An appropriate example is shown in Appendix I. This example will be used as a template to create future purchase orders.

A further asset is created by clicking on the Other Resources Category button 1606 on the Assets Categories screenshot 1600. This asset is called TermsAndConditions.XML and contains the following XML code:

```
<ts_and_cs>
    <delivery>Goods are delivered within 28 days from date of order,
unless specified otherwise</delivery>
    <payment_period unit="days">30</payment_period>
    <refunds_returns>
```

Returns will only be accepted if goods are in original condition, including packaging.

Refunds are only payable if goods are faulty and returned within 28 days of receipt.

```
    </refunds_returns>
</ts_and_cs>
```

Now that the assets are in place, some rules should be defined so that the assets and the patterns can interact (step 616). The user therefore proceeds as follows, utilising the Rule Creation means 218.

Figure 20:
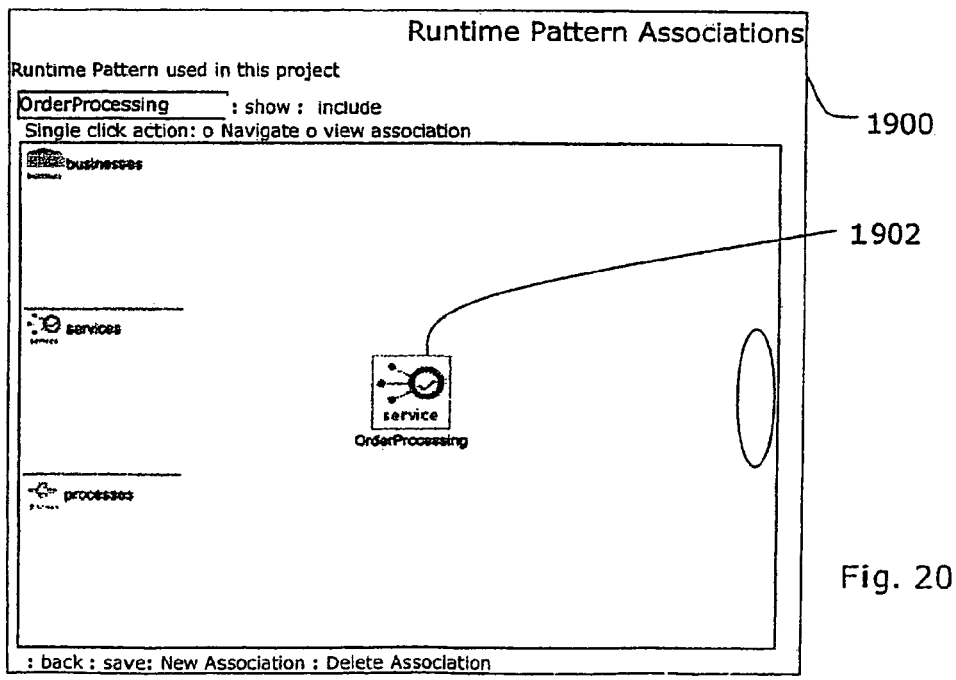
Figure 21:
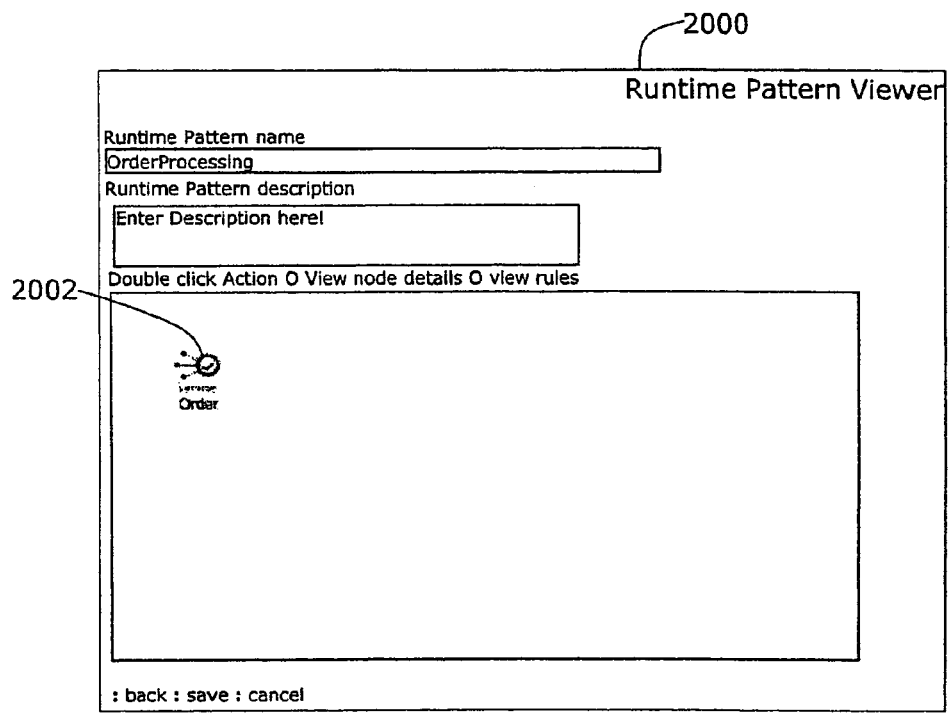
Figure 22:
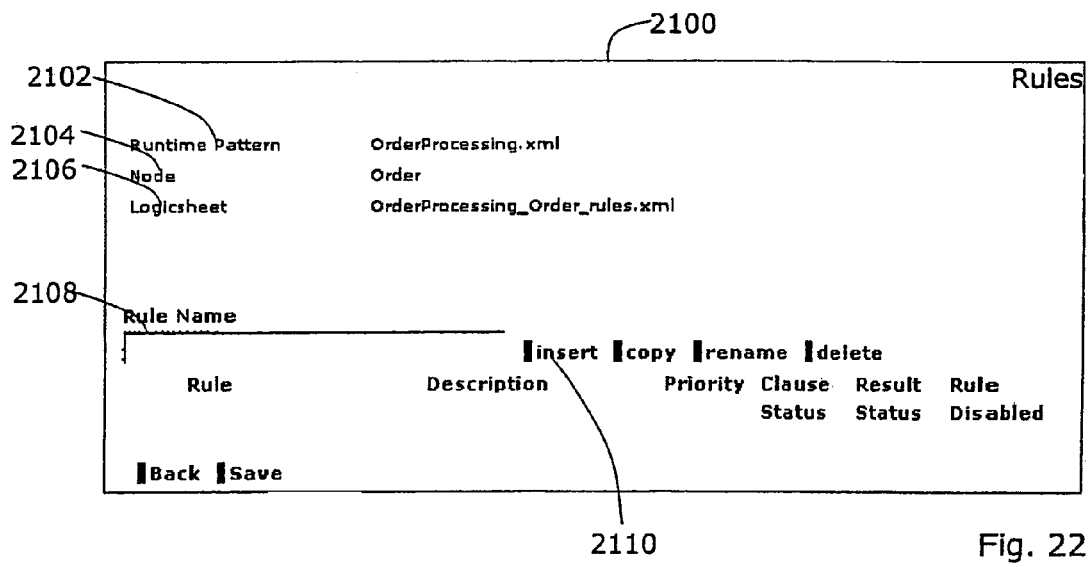

From the Designs screenshot 900 shown in FIG. 9, the user is able to navigate to a screen setting the run-time associations of the OrderProcessing pattern. A Runtime Associations screenshot 1900 is shown in FIG. 20. The Runtime Associations screenshot 1900 comprises an OrderProcessing button 1902 buttons showing the runtime associations (or links provided by the Linking means 222) of the defined OrderProcessing patterns. In this example, there are at present no runtime associations for this pattern. Patterns can however be linked (or 'spliced') using the linking means using this GUI. By clicking on the OrderProcessing button 1902, the user accesses a GUI comprising a Pattern Node Viewer screenshot 2000 as shown in FIG. 21.

The pattern Node Viewer Screenshot 2000 comprises a Node button 2002. The Node button provides a link to the node 400 called Order, defined above. By clicking on the Node button 2002, the user accesses a screen as shown in the Rulemaker screenshot 2100 of FIG. 22. The rule being constructed in this example is:

'IF an incoming message has the structure of a purchase order, THEN add Terms and Conditions'

Figure 23:
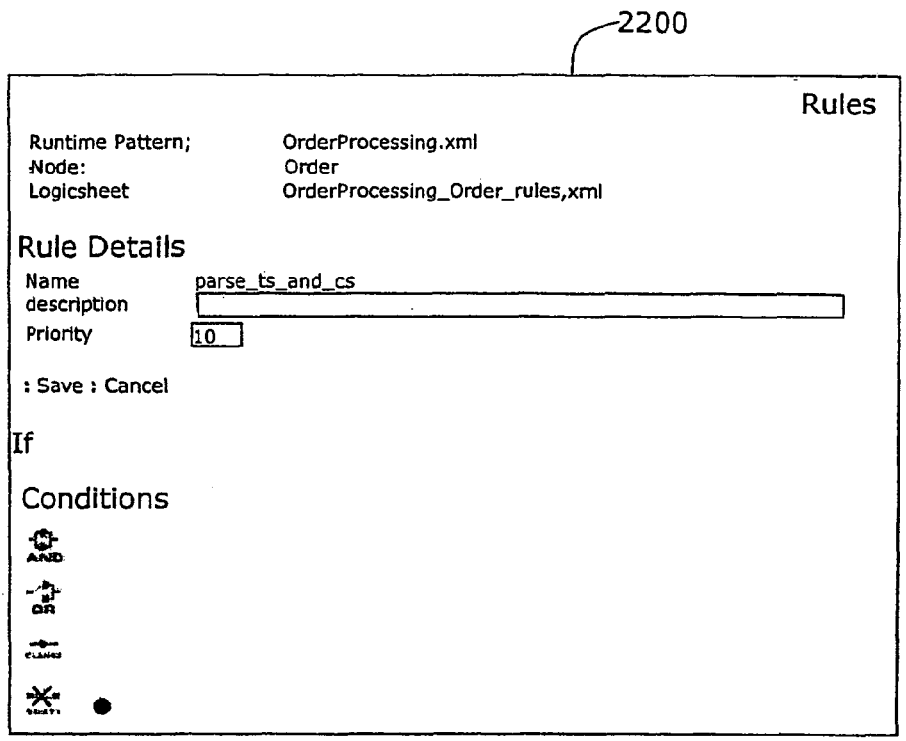
Figure 24:
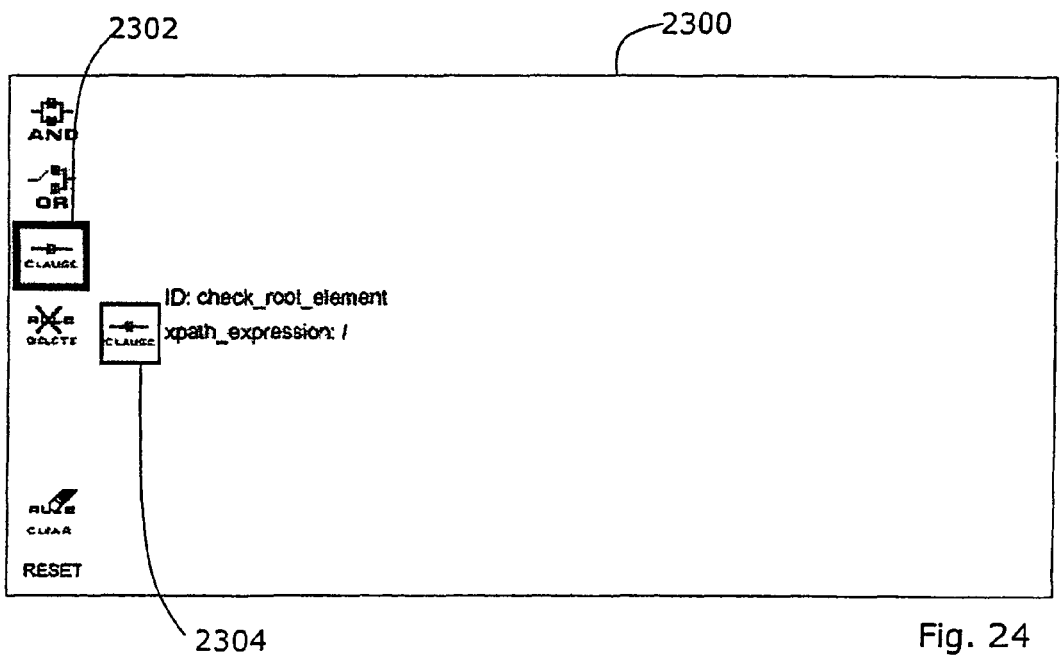

The Rulemaker Screenshot 2100 identified the runtime pattern 2102 (OrderProcessing.XML), its associated node 2104 (Order) and the associated rule set 2106 (OrderProcessing_Order_rules.XML), which it should be remembered was a blank rule set created on cloning the runtime pattern. The Rulemaker Screenshot 2100 further comprises Rule Name entry box 2108 and an Insert Rule button 2110. The user creates a new rule by typing parse_ts_and_cs into the Rule Name entry box 2108, and clicking on the Insert Rule button 2110 to add the rule. The user then clicks on the new rule to go through to a further GUI such as is shown in FIG. 23 comprising a Rules screenshot 2200.

A rule consists of two components—the Clause and the Result. The Rules screenshot 2200 shows the GUI for Conditions which govern the Clause component of a rule. A portion of the GUI is shown in a Conditions screenshot 2300 of FIG. 24.

The first stage in defining a new rule is to create a new clause. The Conditions screenshot comprised a Clause button 2302. The user can click on the Clause button 2302 and create a new clause called check_root_element. This creates a check_root_element clause button 2304 on the Conditions screenshot 2300. Clicking on the check_root_element clause button 2304 takes the user to a GUI as shown in a Clause screenshot 2400 of FIG. 25.

The Clause screenshot 2400 comprises a parameter button 2402 allowing a user to set the parameters for a clause. In this case the rule is to be an XPath rule. Xpath, as will be known to those skilled in the art, is a language for addressing parts of an XML document. By clicking on the parameter button 2402, the user accesses a GUI such as is shown in FIG. 26, showing a Parameter screenshot 2500. This comprises a Value entry box 2502. A Value, in this context, is the value in the Condition. For example, in the Condition, If X is true, then do Y, X is the Value. The user types in the XPath to the value that we wish to test for—in this case, /po—in the Value entry box 2502. It should be remembered that po was the message asset defined above. The condition is therefore 'IF the incoming message has the format of purchase order'.

Figure 27:
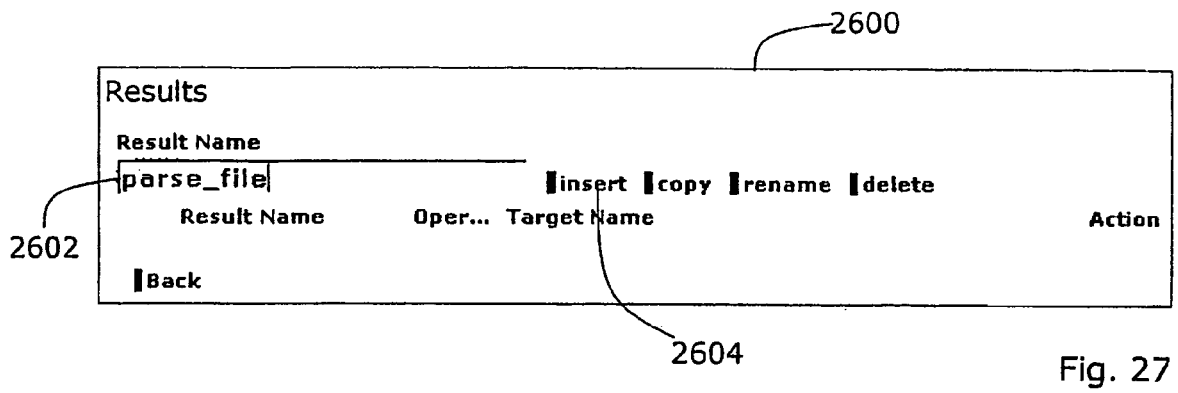
Figure 28:
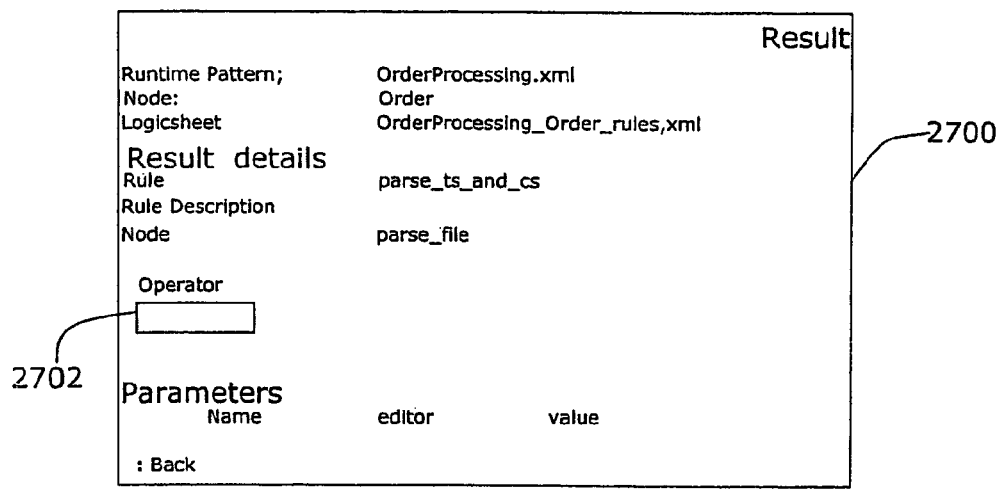
Figure 29:
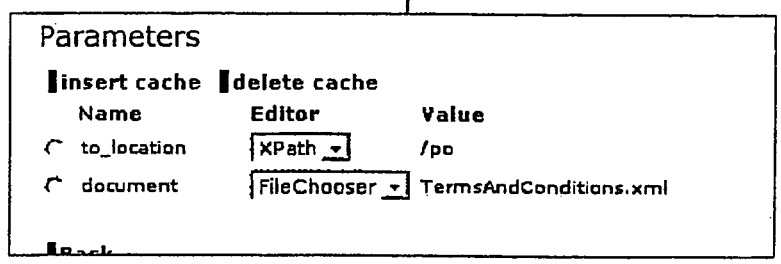

Now that the Condition has been defined, the Result (the Y of the above example) needs to be defined. This is achieved by navigating from the Rulemaker Screenshot 2100 to a Results screenshot 2600 as is shown in FIG. 27. The Results screenshot 2600 comprises a Results Name entry box 2602 and an Insert Rule button 2604. The user proceeds by entering the name 'parse_file' in the Results Name entry box 2602 and clicking the Insert Rule button 2604. The user can then access a Results Detail screenshot 2700 as is shown in FIG. 28. As well as summarising the progress to date, the Results Detail screenshot 2700 comprises a drop down box 2702 comprising a list of operators. Examples of operators include parsing, transferring, validating, etc.

In a similar manner to that described above for the Parameters of the Condition, the Parameters of the Result have to be set. The user defines an Xpath parameter called 'to_location' with a value of /po, and a filechooser parameter called 'document' with the value 'TermsAndConditions.XML, the asset defined above. A filechooser is arranged to allow a user to browse through the assets. The result of this is summarised in FIG. 29. The completed rule is then stored in the Rule Storage means 208.

Next the user must associate the TermsAndConditions.XML file with an message transceiver using the linking means 222 so that it will be deployed with it (step 618). This is done though the clone base pattern screenshot 1400 GUI. By following links, the user reaches a GUI as shown in an Engine and Resource Details Screenshot 2900 of FIG. 30. This screenshot 2900 comprises an Available Resource Categories drop down box 2902, from which the user may select a category 2904, in this example, the Other Resources category. The screenshot 2900 further comprises a Resources in Category drop down box 2906, from which the user may select a resource 2908, in this case, TermsAndConditions.XML. Finally, the screenshot 2900 comprises an Add Resource button 2910. The user can add the selected resource by clicking this button 2910. Through this GUI, resources can be linked to or unlinked from, nodes.

At the time of deployment links between the patterns, nodes, etc. become specific. During the creation of the components links between the components are specified 613. However, at the creation time the links do not relate to the physical arrangement of the system on which the application will be run. Therefore, at deployment time the physical nature of the links is specified 619. This may include specifying the location of the component that the link links (and therefore whether the link is a virtual link on the same processing circuitry or whether the link links two or more processing circuits, etc.), what transmission protocol the link will use (HTTP, SMTP, SOAP, etc.).

Figure 31:
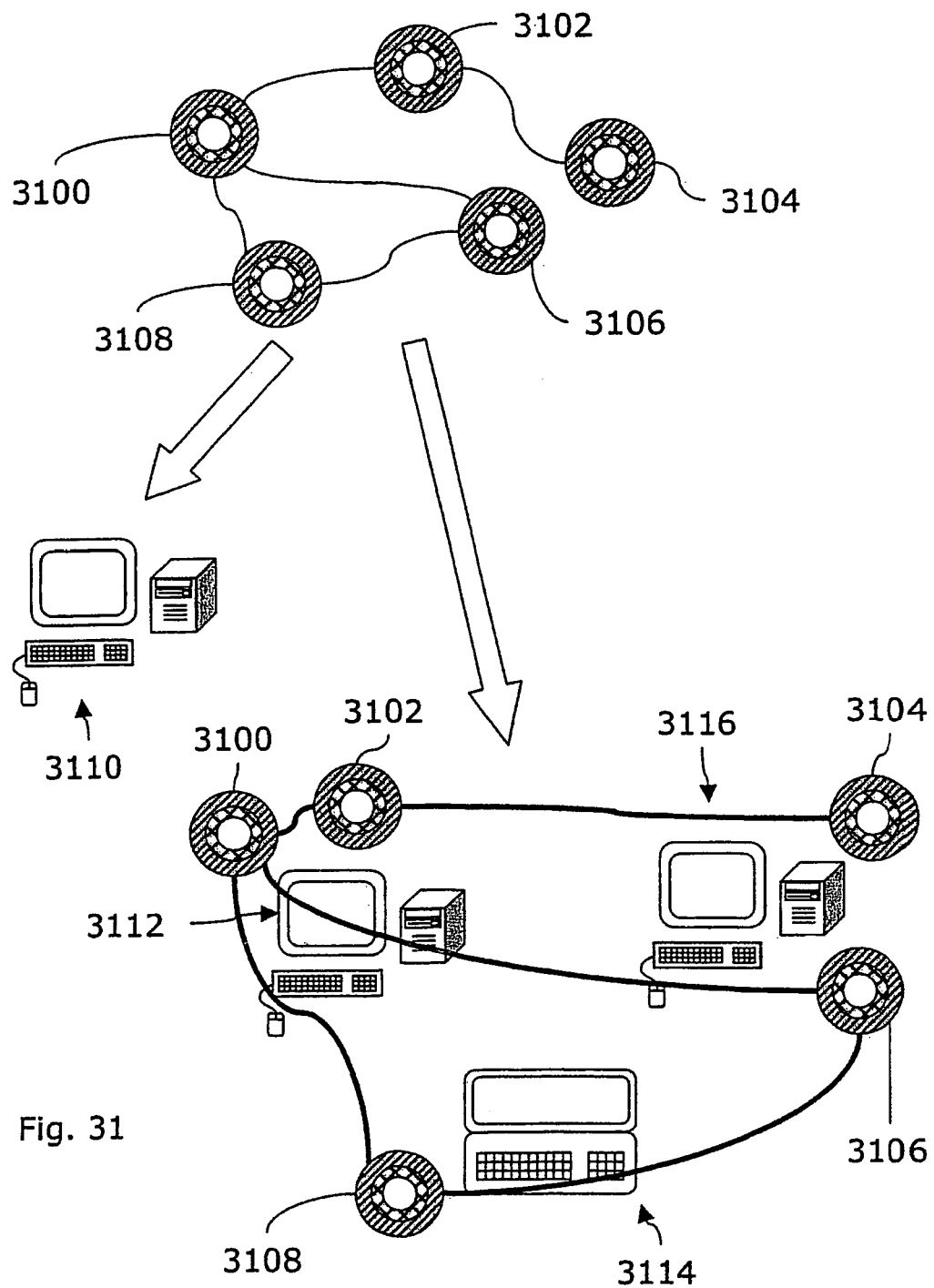
FIG. 31 shows two possible physical arrangements for a conceptual specification of an application.

An example of this can be seen in FIG. 31. During creation of the application (the subject of this Figure) five nodes 3100, 3102, 3104, 3106, 3108 have been created and are linked as shown in the Figure. During creation of the application these links are not specific and it is only during deployment and in particular step 619 that the links are fully defined. For example, all five of the node 3100-3108 could be mapped to run on the same computer 3110.

In an alternative mapping, also shown in FIG. 31, two of the nodes 3100 and 3102 are mapped to a computer 3112, two of the nodes 3104 and 3106 are mapped to a computer 3116 and the fifth node 3108 is mapped to a PDA 3114. The necessary links to connect the five nodes 3100-3108 are defined during step 619 of the deployment.

The project is now ready to be deployed in step 620 using the Deployment means 224 which in turn accesses the Deployment platform 210. This is achieved though clicking the Deployment button 908 on the Design screenshot 900.

From this description, it should be appreciated that the system described herein, being highly modular, is highly adaptable. Once a node or an asset has been established, assets can be associated with nodes and Nodes linked to each other, and such associations and links changed, with great ease. The same is true for links between patterns. Further, the graphical character of the system makes it easy for a user to keep track of the system as it develops and to identify where changes need to be made.

The invention claimed is:

1. A method of creating an application for executing on at least one machine having a memory, the method comprising:
 creating a definition of at least one node and a specification, which are both held in at least one machine readable data file and written in a markup language;
 the specification being arranged to be processed by a run time environment and the specification defining:

i: how the at least one node interacts with other nodes during the processing of the specification;

ii: resources useable by the at least one node during the processing of the specification;

iii: at least one set of predetermined rules used by the at least one node during the processing of the specification; and iv: a set of messages which are arranged to be passed between nodes during the processing of the specification;

causing the run time environment to process the specification held in the machine readable data file such that the at least one node, as defined therein, is implemented within the memory of the machine thereby becoming a memory resident node;

the at least one memory resident node being arranged to:

i. receive messages as defined within the specification;

ii. process, according to rules defined in the specification for that node, data provided to the at least one memory resident node by messages such that rules are triggered if predetermined data is present within a message; and iii. output further messages dependent upon triggering of rules within the node; and creating the application by processing of the specification, in the run time environment, such that at least one memory resident node is interconnected according to at least one of the specification and data input, wherein data input to the application is processed by the at least one memory resident node and, if further processing is required, forwarded to other nodes via links for that processing and links between nodes are dynamically configured responsive to amendments to the specification during processing thereof by the run time environment.

2. The method according to claim 1 in which a plurality of nodes are created.

3. The method according to claim 1 which further comprises providing a library of nodes containing at least one node and selecting at least one of the nodes from the library of nodes.

4. The method according to claim 1 which further comprises arranging the or each node to comprise a plurality of layers, each layer being arranged to perform a predetermined function.

5. The method according to claim 4 which further comprises arranging the layers of the nodes to be interchangeable and wherein altering at least one of the layers can change the overall functionality of a node.

6. The method according to claim 4 which further comprises providing a library of layers containing at least one layer and selecting at least one layer from the library of layers.

7. The method according to claim 4 which comprises arranging at least one of the layers of a node to act as a transport layer arranged to receive and send data to and from the node.

8. The method according to claim 4 which comprises arranging at least one of the layers of a node to act as a message transceiver arranged to send and receive messages to other nodes to which that node is connected.

9. The method according to claim 8 in which the at least one node has an identity and in which the application is arranged to be run and, at runtime, as nodes are connected together, the method further comprising arranging the message transceiver layer of a node to discover the identity of nodes to which it is connected at runtime.

10. The method according to claim 4 which comprises arranging at least one of the layers of a node to act as a rule processing engine arranged to apply the predetermined rules to data that the node receives.

11. The method according to claim 10 in which the rule processing engine layer of a node uses forward chaining rule logic.

12. The method according to claim 10 which comprises providing a rule set of at least one rule in a file that is used by the rule processing engine.

13. The method according to claim 12, which comprises specifying the file in which the rules are located by a link.

14. The method according to claim 10 which comprises defining each rule set that is to be used by the application in the specification.

15. The method according to claim 1 which comprises writing the messages in a flat text format, which may be any of the following: American Standard Code for Information Interchange (ASCII), Extensible Markup Language (XML), EDI (Electronic Data Interchange).

16. The method according to claim 1 which comprises providing a pattern, arranging the at least one node within the pattern and defining how nodes therein interact with one another.

17. The method according to claim 16, which comprises providing a library of patterns containing at least one pattern that can be used in creating an application.

18. The method according to claim 1 in which the specification is arranged to determine at least one of the following: which nodes are to be used; which nodes interact with one another; which patterns are to be used; which assets are to be used.

19. The method according to claim 1 which comprises providing files arranged to define the application specified therein, arranging the specification to be capable of deploying files and using the specification to deploy the files.

20. The method according to claim 19 which comprises arranging the files specifying the application to be XML files.

21. The method according to claim 1 in which the data processed by the application is specified in an XML file.

22. The method according to claim 1 in which data processed by the application is specified in an image file.

23. The method according to claim 1 in which data processed by the application is specified in a flat text file such as an ASCII) file, a raw text file, and EDI file.

24. The method according to claim 1 which comprises providing a graphical tool arranged to enable a user to specify components of the application.

25. The method according to claim 24 which comprises providing a library of at least one of the following: nodes; node layers; specification; patterns; messages; rule sets; style sheets; schemas and in which the graphical tool allows a user to select components from one of said libraries.

26. The method according to claim 25 which allows a user to define further libraries.

27. The method according to claim 24 which comprises providing at least one pattern arranged to define how nodes interact arranging the at least one pattern such that it is capable of interacting with at least one other pattern and arranging the graphical tool to allow a user to specify how the patterns and nodes interact with one another.

28. The method according to claim 24 which comprises using the graphical tool to perform at least one of the following: create the specification; edit the specification.

29. The method according to claim 24 which comprises using the graphical tool to manipulate any components of the specification.

30. The method according to claim 1 which comprises creating and deploying files and processing the files in the run time environment.

31. The method according to claim 1 in which at least one node is provided to provide an output from the application.

32. A machine readable storage medium containing instructions which when read onto a computer cause that computer to perform the method of claim 1.

33. The method according to claim 1 in which the node, specification, and messages are at least in part written in XML.

34. The method of claim 1, wherein the or each node is arranged to manipulate data contained in a message.

35. The method of claim 34, wherein the or each node is arranged to manipulate XML data contained in the message.

36. The method of claim 1, wherein the or each node is arranged, during processing of the machine readable data file, to output data to any of the nodes to which it is arranged to be connected.

37. The method of claim 1, wherein the run time environment directly processes the specification held in the machine readable data file.

38. The method of claim 1, wherein the run time environment processes the specification held in the machine readable data file without the need for extra processing of the specification.

39. The method according to claim 1, wherein the specification and the data contained within the messages are written in the same language.

40. The method according to claim 1, wherein the rules implemented by the specification contain business logic.

41. A computer system having a memory and being arranged to create an application, said system comprising:
   a node creator arranged to create at least one machine readable data file containing a definition of at least one node and a specification, the definition and specification each written in a markup language;
   the specification being arranged to be processed by a run time environment and the specification defining:
      i: how the at least one node interacts with other nodes during the processing of the specification;
      ii: resources useable by the at least one node during the processing of the specification;
      iii: at least one set of predetermined rules used by the at least one node during the processing of the specification; and
      iv: a set of messages which are arranged to be passed between that node and any other node during the processing of the specification;
   a linker arranged to connect, dynamically according to at least one of the specification and any data input to the application, at least two nodes such that data is arranged to pass between the nodes and the linker is arranged to interact with the node creator to modify the definition provided by the specification;
   a deployer arranged to deploy the application from the definition created by the node creator and the linker according to the specification wherein the run time environment is arranged to implement the nodes in the memory of the computer system, the at least one node thereby becoming a memory resident node and the at least one memory resident node being arranged to process data according to the rules wherein at least one of the rules is triggered if predetermined data is present and an output is generated from that memory resident node.

42. The computer system according to claim 41 which comprises at least one processor arranged to process data, including the definition, and on which the definition created by the node creator and modified by the linker is processed.

43. The computer system according to claim 42 which comprises at least one processing apparatus comprising the at least one processor and in which the linker is arranged to connect nodes running on the processor within the processing apparatus.

44. The computer system according to claim 43 which comprises a plurality of processors, each remote from the other and having a connector therebetween capable of transmitting data between the processors.

45. The computer system according to claim 44 in which each of the processors is provided on a separate processing apparatus.

46. The computer system according to claim 44 in which the linker is arranged to connect nodes provided on processors remote from one another.

47. The computer system according to claim 41 in which the deployer deploys the definition that causes the nodes to communicate with one another using one of Hypertext Transfer Protocol (HTTP) and direct memory protocols.

48. The computer system according to claim 41 in which the node creator is arranged to utilise at least one of the following: predetermined definitions and pre-written definitions.

49. The computer system according to claim 48 in which the pre-written definition is provided in at least one library.

50. The computer system according to claim 41 which further comprises a pattern creator arranged to create at least one pattern of nodes.

51. The computer system according to claim 41 which further comprises a pattern cloner arranged to clone a pattern of nodes.

52. The computer system according to claim 41 which further comprises a rule creator arranged to allow predetermined rules to be created and edited.

53. The computer system according to claim 41 which further comprises at least one of the following: a node storage; a pattern storage; a rule storage.

54. A machine readable storage medium containing instructions which when read onto a computer cause that computer to function as the computer system according to claim 41.

55. The computer system of claim 41, wherein the run time environment is arranged to implement the nodes in the memory of the computer system without the need for extra processing of the specification.

56. A computer system having a memory and being arranged to run an application, said system comprising:
   a run time environment arranged to process a definition of at least one node and a specification which are both written in a markup language and held within a machine readable data file, the specification defining:
      i: how the at least one node interacts with other nodes during the processing of the specification;
      ii: resources useable by the at least one node during the processing of the specification;
      iii: at least one set of predetermined rules used by the at least one node during the processing of the specification; and
      iv: a set of messages which are arranged to be passed between nodes during the processing of the specification;

wherein the run time environment is arranged to implement the at least one node in the memory of the computer system, the node thereby becoming a memory resident node and the at least one memory resident node being arranged to process data according to the rules wherein at least one of the rules is triggered if predetermined data is present and an output is generated from that memory resident node;

the run time environment also comprising a linker which is arranged to connect, according to at least one of the specification and any data input to the application, the at least one node to any other nodes such that data input to the application is processed by the at least one node and, if further processing is required, forwarded to the other nodes for that further processing, such that links between nodes are dynamic responsive to amendments to the specification during processing thereof in the run time environment.

57. A machine readable storage medium containing instructions which when read onto a computer cause that computer to function as the computer system according to claim 56.

58. The computer system of claim 56, wherein the run time environment is arranged to implement the at least one node in the memory of the computer system without the need for extra processing of the specification.

* * * * *